United States Patent
Arita et al.

(10) Patent No.: US 6,493,061 B1
(45) Date of Patent: Dec. 10, 2002

(54) IMAGE READING APPARATUS

(75) Inventors: Shinichi Arita, Fukuoka (JP); Kazuyuki Kondo, Kanagawa (JP); Tadao Hayashide, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/690,090

(22) Filed: Oct. 17, 2000

(30) Foreign Application Priority Data

Oct. 19, 1999 (JP) ............................................ 11-296758
Jul. 31, 2000 (JP) ........................................ 2000-231124

(51) Int. Cl.[7] ...................... G03B 27/52; G03B 27/00; H04N 1/04
(52) U.S. Cl. ............................ 355/41; 355/18; 355/40; 358/374
(58) Field of Search ............................ 355/18, 30, 40, 355/41, 52, 55; 358/471, 474, 486, 491; 356/237; 250/208.1

(56) References Cited

U.S. PATENT DOCUMENTS

| | | | |
|---|---|---|---|
| 5,241,378 A | 8/1993 | Nishiguchi | ................. 358/500 |
| 5,471,281 A | 11/1995 | Hayashi et al. | ............. 155/201 |
| 5,473,426 A | 12/1995 | Hayano et al. | ............. 356/237 |
| 5,886,342 A | 3/1999 | Matsui | .................... 250/208.1 |
| 6,323,967 B1 | 11/2001 | Fujinawa | .................... 358/484 |

*Primary Examiner*—Russell Adams
*Assistant Examiner*—Hung Henry Nguyen
(74) *Attorney, Agent, or Firm*—Fitzpatrick, Cella, Harper & Scinto

(57) ABSTRACT

Transmitted light from a transmitting original recording medium based on light from a first light source which emits light in at least the visible light range is introduced to a solid imaging element via an infrared cutout filter. Image information recorded on the transmitting original recording medium is read based on signals obtained from the solid imaging element. Transmitted light from a transmitting original recording medium, based on light from a second light source, which emits light only in the infrared range, is introduced to the solid imaging element without passing through the infrared cutout filter. Defect information of the recording medium itself is read based on signals obtained from the solid imaging element, so that the read defect information can be removed from the read image information. This enable the recorded image on the film to be read in a suitable manner.

23 Claims, 31 Drawing Sheets

IMAGE READING APPARATUS

BACKGROUND OF THE INVENTION

1. Field of the Invention

The present invention relates to an image reading apparatus, and particularly to an image reading apparatus in which light transmitted from a transmitting original recording medium is imaged on a solid imaging element in an imaging optical system, so as to read the information from the original.

2. Description of the Related Art

Conventionally, there are color image scanners, color photocopiers, and the like, as image reading apparatus for converting image information from original documents and the like into electric signals and importing this into a computer.

FIG. 23 is a diagram illustrating a schematic configuration of a conventional image reading apparatus. This image reading apparatus is an apparatus with a 2-to-1 scanning optical system which irradiates light onto an original document recorded on a non-transparent sheet, and processes the light reflected from the sheet, i.e., reads a reflecting original. A 2-to-1 scanning optical system means an optical system in which part of the scanning optical system operates at ½ the scanning speed in the sub-scanning direction, as described later.

As shown in FIG. 23, a reflecting original 103 placed on an original table glass 100 is illuminated by direct light flux from a reflecting original illuminating lamp 101 and by reflected light flux from a reflecting shade 102, and the reflected light from the reflecting original 103 is sent to a CCD 107 via a mirror 104, roof mirror 105, and imaging lens 106, where multiple unit solid imaging elements arrayed in line fashion to form the CCD 107 convert the reflected light into electrical signals, thereby forming the image in the main scanning direction.

Also, regarding image forming in the sub-scanning direction, the reflecting original illuminating lamp 101, reflecting shade 102, and mirror 104 are mechanically moved in the sub-scanning direction at a predetermined scanning speed relative to the reflecting original 103, and further the roof mirror 105 follows in the same direction at ½ of the predetermined scanning speed, keeping the length of the optical path from the reflecting original 103 to the CCD 107 (i.e., the conjugated relation) constant, thereby forming a two-dimensional image as a total when combined with the main scanning.

Also, particularly for color reading, the 3-line color image reading method is generally known, wherein a lamp having white spectral properties is used for the reflecting original illuminating lamp 101, and a 3-line type CCD having filters for each of the colors of RGB is used for the CCD 107, so as to simultaneously read the image information for each of the colors of RGB with a single scan on an image processing circuit, and the signals for each of the colors of RGB on the same line are overlaid to form a color image. A light source switchover color image reading method uses three lamps having the spectral distribution of each of the colors of R, G, and B, and a 1-line CCD having sensitivity over the entire white area.

It is also possible to transmit original reading system for positives, negatives, and the like, by adding a simple configuration to such image reading apparatuses.

FIG. 24 is a diagram illustrating a schematic configuration in an image reading apparatus for reading transmitting originals. This image reading apparatus also is a 2-to-1 scanning optical system. Note that the configuration of the image reading apparatus shown in FIG. 24 is the same as the configuration of the image reading apparatus shown in FIG. 23, so the same components will be denoted with the same reference numerals.

As shown in FIG. 24, the transmitting original 108 such as a positive or a negative placed on the original table glass 100 is illuminated with a transmitting original illuminating lamp 110 via a scattering plate 109 provided above, and a main scanning direction image is formed in the same manner with the transmitted light from the transmitting original 108 with the same process as that of the image recording apparatus shown in FIG. 23, i.e., by converting into electrical signals at the CCD 107 via the mirror 104, roof mirror 105, and imaging lens 106. Also regarding the image forming in the sub-scanning direction here, the transmitting original illuminating lamp 110 and mirror 104 are mechanically moved in the sub-scanning direction relative to the transmitting original 108 while maintaining the same speed and same phase, and further in the same manner as with the reflecting original, the roof mirror 105 follows in the same direction at ½ of the scanning speed, keeping the length of the optical path from the transmitting original 108 to the CCD 107 (i.e., the conjugated relation) at a constant, thereby forming a two-dimensional image as a total when combined with the main scanning.

Also, image reading apparatuses with integrated optical systems which is a different method from the above-described 2-to-1 scanning optical system, are also known.

FIG. 25 is a diagram illustrating the schematic configuration of a conventional integrated optical system image reading apparatus that reads reflecting originals. Note that the configuration of the image reading apparatus shown in FIG. 25 is basically the same as the configuration of the image reading apparatus shown in FIG. 23, so the same components will be denoted with the same reference numerals.

A reflecting original illuminating lamp 101, reflecting shade 102, mirrors 104a, 104b, 104c, imaging lens 106, and CCD 107 are positioned within an optical unit 111, and the optical unit 111 itself moves with respect to the reflecting original 103.

FIG. 26 is a diagram illustrating the schematic configuration of a conventional integrated optical system image reading apparatus which reads transmitting originals. Note that the configuration of the image reading apparatus shown in FIG. 26 is basically the same as the configuration of the image reading apparatus shown in FIGS. 24 and 25, so the same components will be denoted with the same reference numerals. Further, the operation of the image reading apparatus shown in FIG. 26 is the same as the operation of the image reading apparatus shown in FIG. 25, so description thereof will be omitted.

The image reading by these integrated optical system image reading apparatuses is similar to a 2-to-1 scanning optical system, but with the transmitting original reading for example, as shown in FIG. 26, the transmitting original 108 such as a positive or a negative placed on the original table glass 100 is illuminated with a transmitting original illuminating lamp 110 via a scattering plate 109 provided above, and a main scanning direction image is formed by guiding the transmitted light from the transmitting original 108 to the integrated optical system. Also with respect to the image forming in the sub-scanning direction, the transmitting original illuminating lamp 110 and optical unit 111 are mechanically moved in the sub-scanning direction relative to the transmitting original 108 while maintaining the same speed and same phase, thereby forming a two-dimensional image as a total when combined with the main scanning.

Now, with the above 2-to-1 scanning optical system and integrated optical system transmitting original image reading apparatuses, two apparatuses are known for detecting foreign matter such as dust existing on the transmitting original or damage to the film surface such as scratches (this detection hereafter will be referred to as "foreign matter/scratch detection"), and removing the effects of the foreign matter and scratches by image processing from the read image. The following is a description of the foreign matter/scratch detection functions.

FIG. 27 is a diagram illustrating a first foreign matter/scratch detecting apparatus. This apparatus is particular a 2-to-1 scanning optical system, and basically has the same configuration as the image processing apparatus shown in FIG. 24. The same components will be denoted with the same reference numerals, and description thereof will be omitted.

The characteristic configuration of the first foreign matter/scratch detecting apparatus is that the transmitting original illuminating lamp 110 has a light-emitting intensity 112 in a particular infrared range other than the visible light range, as shown in FIG. 28. FIG. 28 is a diagram illustrating the spectral intensity distribution properties of the transmitting original illuminating lamp 110, with the maximum of the light-emitting intensity for the vertical axis being set at a value 1 and normalized.

Further, an infrared cutout filter 113 or a visible light cutout filter 114 is inserted in the optical path between the imaging lens 106 and the CCD 107 shown in FIG. 27. The infrared cutout filter 113 has spectral transmittance properties such as indicated by the broken line in FIG. 29, and the visible light cutout filter 114 has spectral transmittance properties such as indicated by the single-dot broken line in FIG. 29. FIG. 29 shows both the spectral transmittance of the infrared cutout filter 113 and the visible light cutout filter 114, and also illustrates the relative light emitting intensity (indicated by a solid line) of the transmitting original illuminating lamp 110.

In the reading mode for reflecting originals and transmitting originals, the infrared cutout filter 113 is inserted in the optical path so as to transmit light in the visible range, and the light-emitting intensity 112 of the transmitting original illuminating lamp 110 at a particular infrared range is cut out. Also, in the foreign matter/scratch detecting mode, the visible light cutout filter 114 is inserted in the optical path instead of the infrared cutout filter 113, the light-emitting intensity 112 is transmitted, and light in the visible range is cut out.

Next, the process for detection of foreign matter and scratches will be described.

First, in the reading mode for reflecting originals and transmitting originals, the infrared cutout filter 113 is inserted in the optical path and the original illuminating lamp 110 is turned on. At this time, the light-emitting intensity 112 of the transmitting original illuminating lamp 110 at a particular infrared range is cut out by the infrared cutout filter 113, so a suitable image without effects of infrared light can be obtained from the CCD 107.

Next, in the foreign matter/scratch detecting mode, the visible light cutout filter 114 is first inserted in the optical path and the transmitting original illuminating lamp 110 is turned on. At this time, the light in the visible range of the original illuminating lamp 110 is cut out by the visible light cutout filter 114, so only the light-emitting intensity 112 of the transmitting original illuminating lamp 110 at the particular infrared range reaches the CCD 107. Now, the transmitting original 108 such as a positive or negative film transmits infrared light regardless of the photosensitive image thereof, so only the image of objects such as foreign matter, dust, scratches, etc., which physically shield the optical path is imaged on the CCD 107 as an inverted image. This foreign matter/scratch detecting image and the image obtained by the above-described reading mode are subjected to image processing, the image of foreign matter and scratches is removed from the image obtained by the reading mode, thereby obtaining a suitable image.

FIG. 30 is a diagram illustrating a second foreign matter/scratch detecting apparatus. This apparatus is also a 2-to-1 scanning optical system, and basically has the same configuration as the image processing apparatus shown in FIG. 24. The same components will be denoted with the same reference numerals, and description thereof will be omitted.

The characteristic configuration of the second foreign matter/scratch detecting apparatus is that instead of the transmitting original illuminating lamp 110, an LED 115 which emits light of the colors R, G, and B is positioned in close proximity to a foreign matter/scratch detecting light source 117 having a light-emitting intensity in a particular infrared range other than the visible light range. The LED 115 is a light source which only emits light in the visible range, as shown in FIG. 31, and the foreign matter/scratch detecting light source 117 has light-emitting intensity in a particular infrared range 116 other than the visible light range, as shown in FIG. 31. FIG. 31 is a diagram illustrating the light-emitting intensity properties of the LED 115 and the foreign matter/scratch detecting light source 117, with the R-light-emitting properties of the LED 115 represented with a broken line, the G-light-emitting properties with a single-dot broken line, the B-light-emitting properties with a solid line, and the properties of the foreign matter/scratch detecting light source 117 with a two-dot broken line.

The process for detection of foreign matter and scratches with the second foreign matter/scratch detecting apparatus will now be described.

In the reading mode for reflecting originals and transmitting originals, the main scanning image reading is performed in the state of the R, G, and B colors of the LED 115 lit, and the foreign matter/scratch detecting light source 117 off. On the other hand, in the foreign matter/scratch detecting mode, image reading of foreign matter, dust, scratches, etc., is performed in the same manner as with the first foreign matter/scratch detecting apparatus, with the R, G, and B colors of the LED 115 off and the foreign matter/scratch detecting light source 117 lit. Both images thus obtained are subjected to image processing, to obtain a suitable image while suppressing image deterioration due to foreign matter and scratches.

However, the above two conventional apparatuses have the following problems.

With the first foreign matter/scratch detecting apparatus, the inserting/extracting mechanism for the two filters makes the foreign matter/scratch detecting apparatus complex. That is, this apparatus is advantageous in that the transmitting original illuminating lamp 110 doubles as a visible light range illumination necessary for the image reading mode and the infrared range illumination necessary in the foreign matter/scratch detecting mode, so that the configuration around the lamp is the same configuration as conventional configurations, but this arrangement requires two filters 113 and 114 with differing spectral transmittance properties, and further a configuration is necessary wherein the infrared cutout filter 113 and visible light cutout filter 114 are selectively inserted to and extracted from the optical path according to the mode, thus making the configuration of the apparatus complex.

Also, with the first foreign matter/scratch detecting apparatus, in the event that a fluorescent lamp or xenon lamp is used as the lamp having light emitting intensity in the visible light range and infrared range, the light-emitting intensity in the infrared range thereof is extremely small when compared to the light-emitting intensity thereof in the visible light range, and also fluorescent lamps and xenon lamps have instability with respect to environmental temperature changes over time. Further, in the event of using a fluorescent lamp or xenon lamp, the light-emitting intensity in the infrared range which is small is further reduced by using a filter at the time of detecting foreign matter and scratches, meaning that noise on the image when the CCD is dark is not negligible, and deterioration in the process of removing the foreign matter/scratch image is unavoidable.

With the second foreign matter/scratch detecting apparatus, the visible light amount is insufficient. This arrangement is advantageous in comparison with the first foreign matter/scratch detecting apparatus in that filters are not needed, but the amount of light from the LED with the R, G, and B colors used as the light source for emitting light only in the visible light range is drastically smaller than that of fluorescent lamps or xenon lamps, meaning that the image reading speed with reduction optical systems using projecting lenses is extremely slow, and thus impractical.

SUMMARY OF THE INVENTION

Accordingly, it is an object of the present invention to provide an image reading apparatus capable of suitably reading image information recorded on a transmitting original recording medium.

To this end, according to an embodiment of the present invention, an image reading apparatus, which images transmitted light from a transmitting original recording medium on a solid imaging element in an imaging optical system so as to read information from the original includes:

a first light source that emits light primarily in the visible light range and in a first infrared range.

A second light source emits light primarily in a second infrared range that does not include the first infrared range.

An infrared cutout unit disposed within the optical path, which does not transmit the light in the first infrared range but does transmit light in the second infrared range.

An image information reading unit guides transmitted light from the transmitting original recording medium based on light from the first light source to the solid imaging element via the infrared cutout unit. The image information reading unit reads image information recorded on the transmitting original recording medium based on signals obtained from the solid imaging element.

A defect information reading unit guides transmitted light from the transmitting original recording medium based on light from the second light source to the solid imaging element via the infrared cutout unit. The defect information reading unit reads defect information other than recorded image information existing on the transmitting original recording medium based on signals obtained from the solid imaging element.

A correcting unit is adapted to remove the defect information read by the defect information reading unit, from the image information read by the image information reading unit.

Also, according to another embodiment of the present invention, an image reading apparatus, which images transmitted light from a transmitting original recording medium on a solid imaging element in an imaging optical system so as to read information from the original includes:

a first light source which emits light at least in the visible light range and a second light source which emits light only in the infrared range.

An infrared cutout filter that does not transmit light in the infrared range and an image information reading unit that guides transmitted light from the transmitting original recording medium based on light from the first light source to the solid imaging element via the infrared cutout filter. The image reading unit reads image information recorded on the transmitting original recording medium based on signals obtained from the solid imaging element.

A defect information reading unit guides transmitted light from the transmitting original recording medium based on light from the second light source to the solid imaging element without using the infrared cutout filter, and reading defect information other than recorded image information existing on the transmitting original recording medium based on signals obtained from the solid imaging element.

A correcting unit removes the defect information read by the defect information reading unit, from the image information read by the image information reading unit.

According to such a configuration, image information on a transmitting original recording medium can be read suitably.

Further objects, features, and advantages of the present embodiment will become apparent from the following description of the preferred embodiments with reference to the attached drawings.

DESCRIPTION OF THE PREFERRED EMBODIMENTS

The following is a description of the embodiments according to the present invention, with reference to the drawings.

First Embodiment

Figure 1:
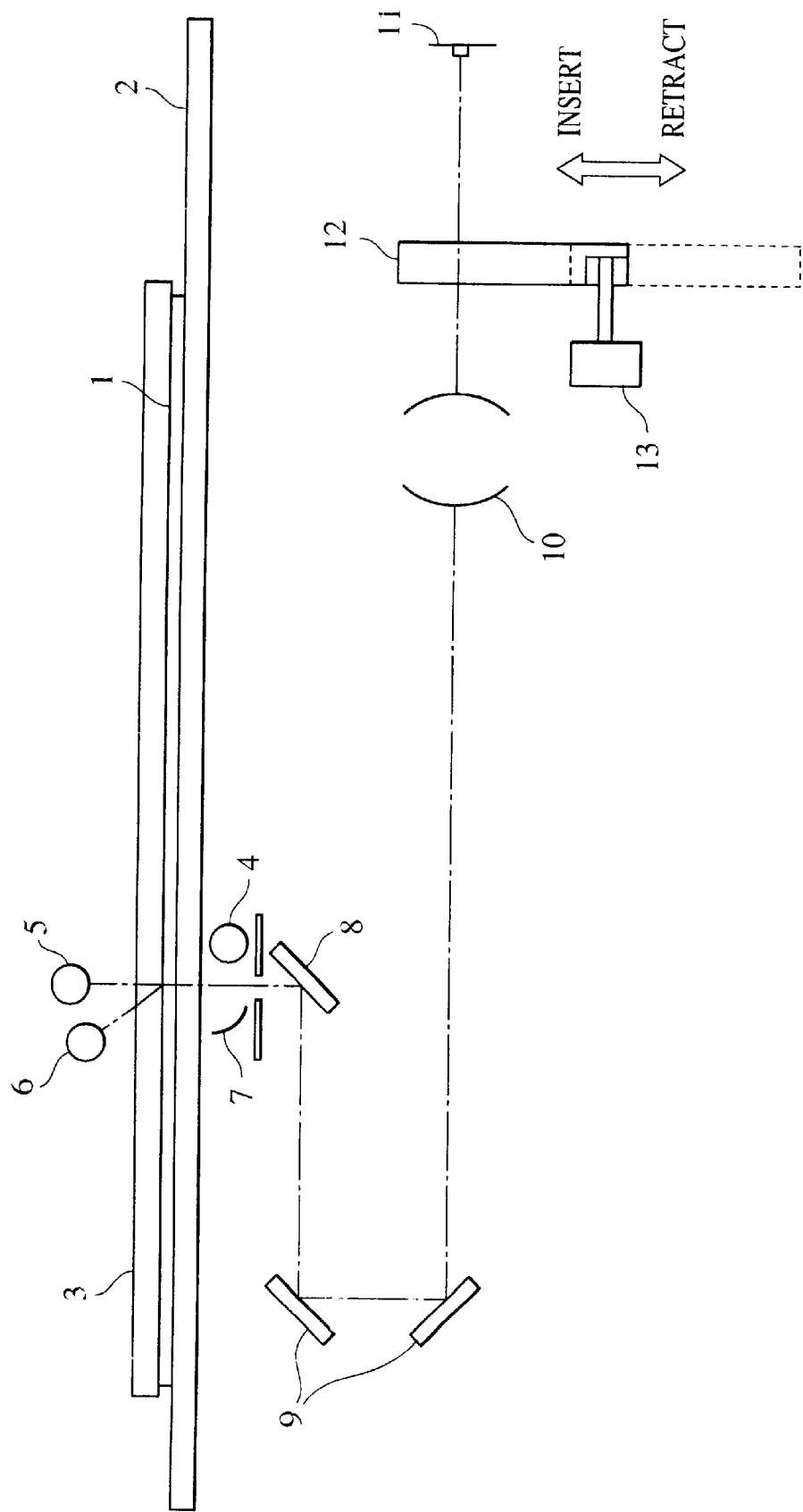
FIG. 1 is a diagram illustrating the configuration of an image reading apparatus according to a first embodiment of the present invention.

FIG. 1 is a diagram illustrating the configuration of an image reading apparatus according to a first embodiment of the present invention. This image reading apparatus is an apparatus with a 2-to-1 scanning optical system which is capable of reading reflecting originals and transmitting originals.

In FIG. 1, reference numeral 1 denotes a transmitting original, 2 denotes an original table glass, 3 denotes a scattering plate, 4 denotes a reflecting original illuminating lamp, 5 denotes a transmitting original illuminating lamp made up of a fluorescent lamp having light-emitting intensity from the visible light range to the infrared range, 6 denotes a foreign matter/scratch detecting lamp made up of an LED having light-emitting intensity only in the infrared range, 7 denotes a reflecting shade, 8 denotes a mirror, 9 denotes a roof mirror, 10 denotes an imaging lens, 11 denotes a CCD, 12 denotes an infrared cutout filter (dichroic filer), and 13 denotes an infrared cutout filter driving device. This infrared cutout filter driving device 13 is for inserting and extracting the infrared cutout filter 12 to and from the optical path.

Figure 2:
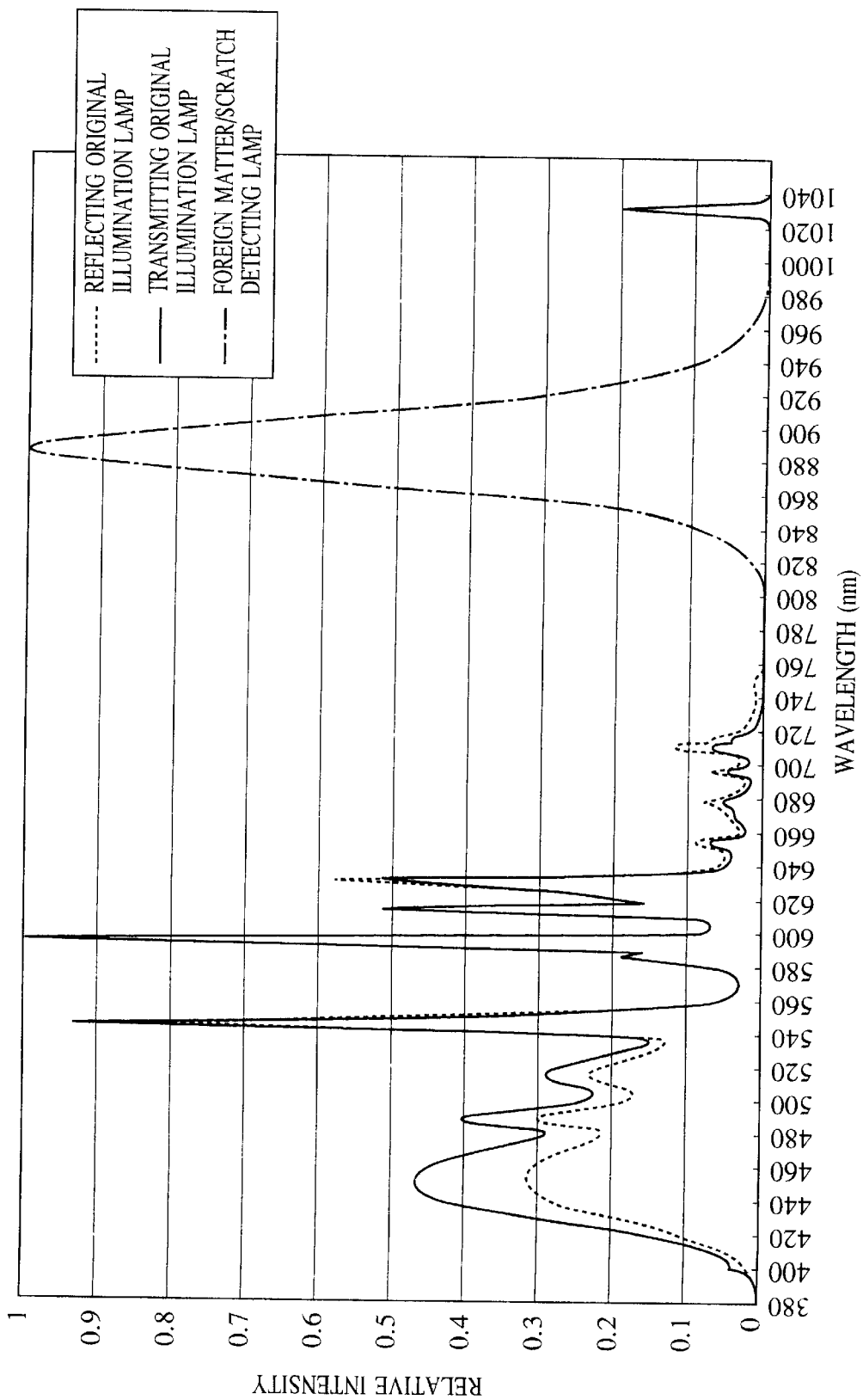
FIG. 2 is a diagram illustrating the spectral intensity distribution of the reflecting original illuminating lamp, transmitting original illuminating lamp, and foreign matter/scratch detecting lamp, according to the first embodiment.

FIG. 2 is a diagram illustrating the spectral intensity distribution of the reflecting original illuminating lamp 4, transmitting original illuminating lamp 5, and foreign matter/scratch detecting lamp 6, showing the properties of the lamps with a broken line, solid line, and single-dot broken line, respectively.

Figure 3:
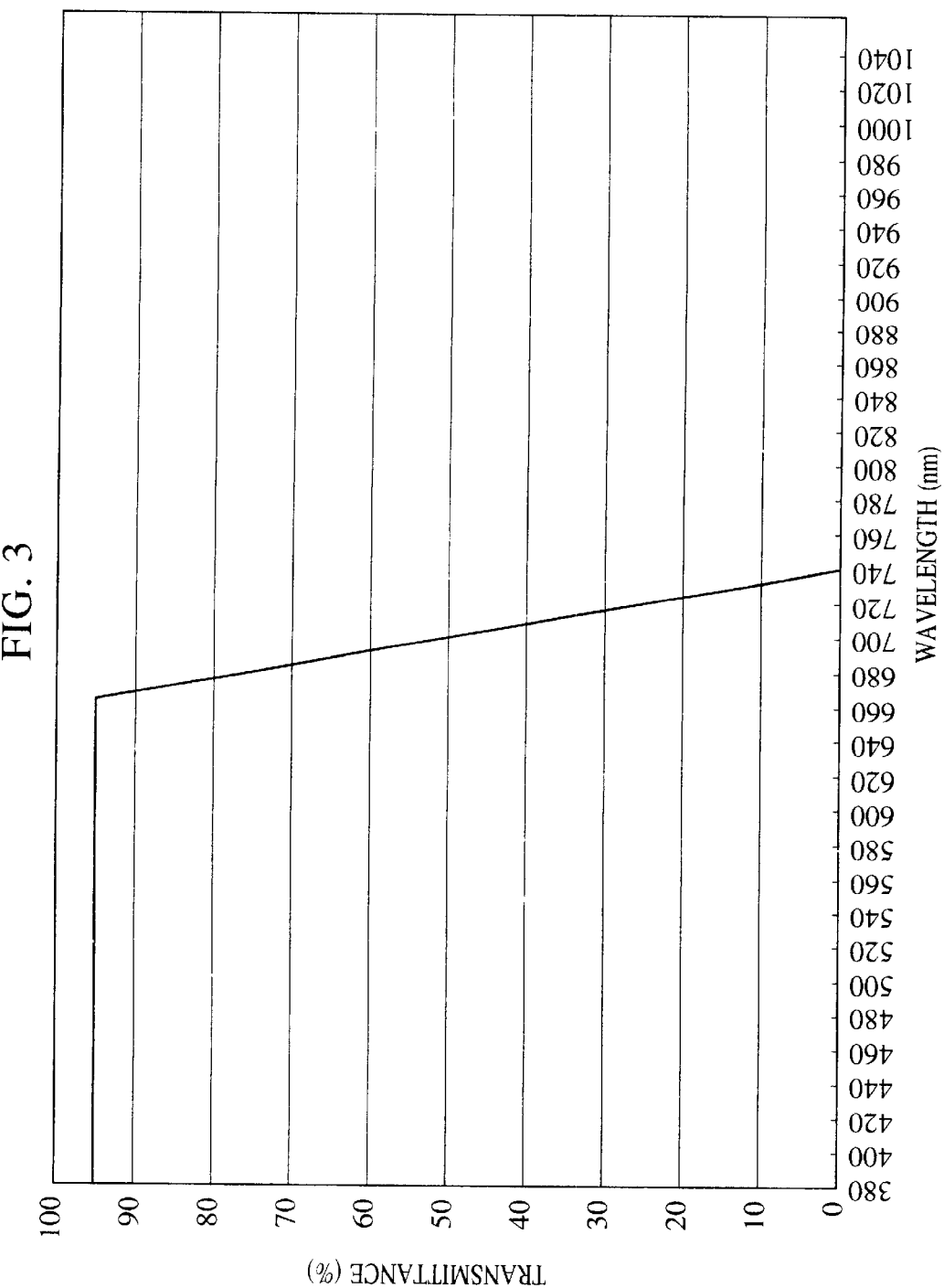
FIG. 3 is a diagram illustrating the spectral transmittance of the infrared cutout filter according to the first embodiment.

FIG. 3 is a diagram illustrating the spectral transmittance of the infrared cutout filter 12.

Next, the reading operation of the transmitting original will be described.

In the transmitting original reading mode, first, the reflecting original illuminating lamp 4 and foreign matter/scratch detecting lamp 6 are turned off, the transmitting original illuminating lamp 5 is turned on, and further, the infrared cutout filter 12 is inserted into the optical path by means of the infrared cutout filter driving device 13. At this time, the illuminating light flux of the transmitting original illuminating lamp 5 passes through the transmitting original 1. The transmitted light flux is scattered uniformly by the scattering plate 3, and the scattered light flux is cast upon the CCD 11 via the mirror 8, roof mirror 9, imaging lens 10, and infrared cutout filter 12.

As shown in FIG. 2, the light from the transmitting original illuminating lamp 5 contains not only visible light but also an infrared component, but this infrared component is removed by the infrared cutout filter 12 having spectral transmittance properties such as shown in FIG. 3 that has been inserted into the optical path, and so the light which reaches the CCD 11 is only the visible wavelength band component. Consequently, there is no deterioration in contrast due to chromatic aberration from the light source containing the infrared range and visible light range. Thus image reading with suitable color reproduction can be realized.

Next, the foreign matter/scratch detecting mode will be described.

First, the reflecting original illuminating lamp 4 shown in FIG. 1 and the transmitting original illuminating lamp 5 are turned off, the foreign matter/scratch detecting lamp 6 is turned on, and the infrared cutout filter 12 is retracted from the optical path by means of the infrared cutout filter driving device 13. At this time, the illuminating light flux of the foreign matter/scratch detecting lamp 6 is scattered uniformly by the scattering plate 3, and the scattered light flux passes through the transmitting original 1. The transmitted light flux is cast upon the CCD 11 via the mirror 8, roof mirror 9, and imaging lens 10.

As shown in FIG. 2, the light of the foreign matter/scratch detecting lamp 6 is only the infrared component, so the transmitting original 1 such as a negative or positive transmits the infrared component regardless of the image (photosensitive image), so an image of dust, foreign matter, scratches, etc., which physically shield the optical path, is cast on the CCD 11 as a shadow, thereby detecting foreign matter and scratches in a suitable manner.

The foreign matter/scratch detecting image thus obtained and the above-described transmitting original reading image are both subjected to image processing, thereby obtaining a suitable transmitting original image with the effects of foreign matter and scratches removed.

Incidentally, in the event of reflecting original reading, the transmitting original illuminating lamp 5 and the foreign matter/scratch detecting lamp 6 are turned off, the infrared cutout filter 12 is inserted into the optical path, and the reflecting original illuminating lamp 4 is turned on, and reading is performed in the same manner as with the transmitting original, thereby allowing suitable image reading to be performed with the effects of the infrared component removed. Also, for the transmitting original illuminating lamp, using a lamp which has great light-emitting intensity in the visible wavelength band such as a fluorescent lamp allows insufficient light to be avoided at the time of reading the image information recorded on the transmitting original recording medium, and thus enabling high-speed reading.

Second Embodiment

Figure 4:
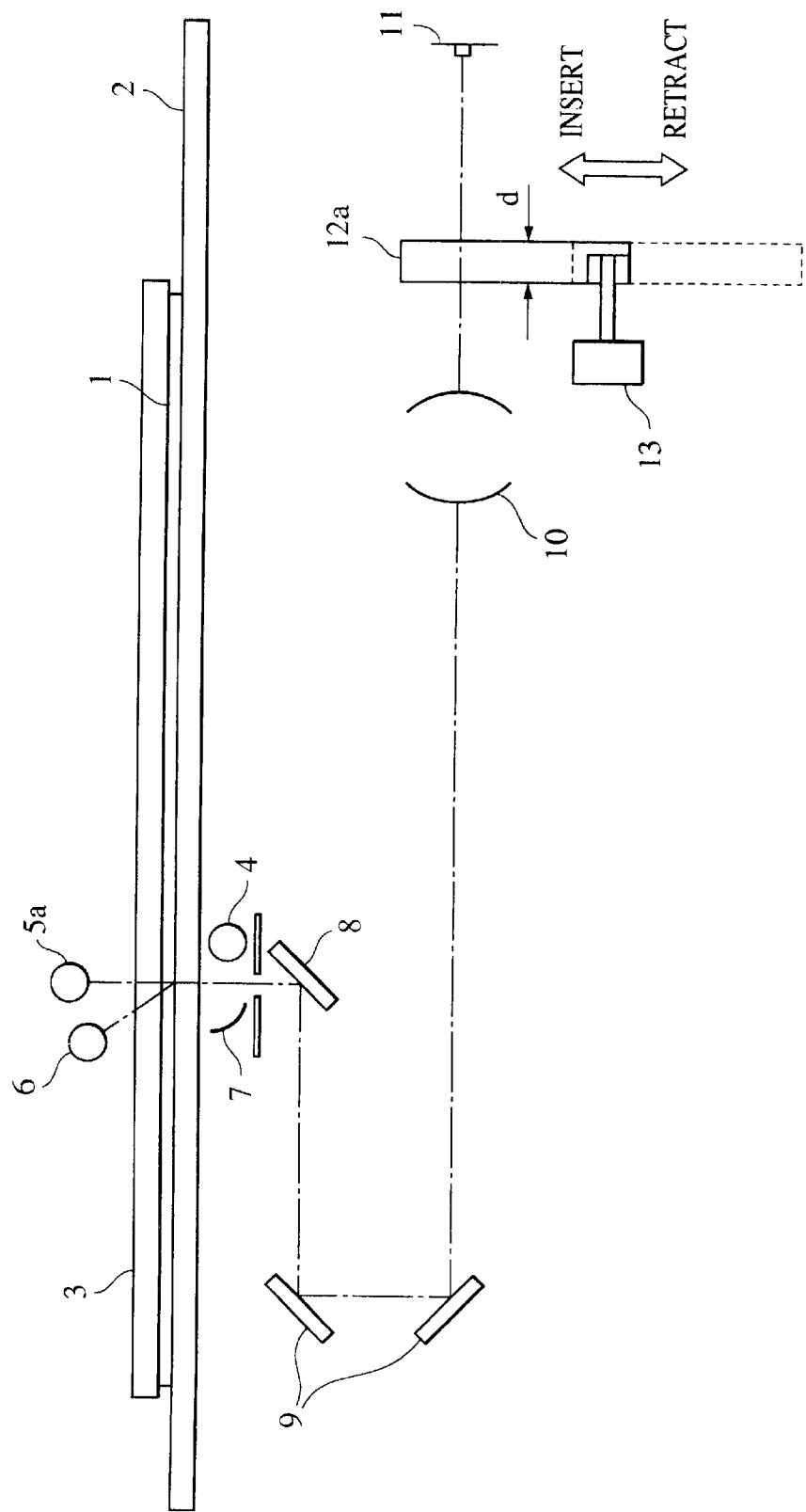
FIG. 4 is a diagram illustrating the configuration of an image reading apparatus according to a second embodiment of the present invention.

FIG. 4 is a diagram illustrating the configuration of an image reading apparatus according to a second embodiment of the present invention. The configuration of the second embodiment is basically the same as the configuration of the first embodiment, so the same components will be denoted with the same reference numerals, and description thereof will be omitted.

In the second embodiment, the transmitting original illuminating lamp 5a is configured of a halogen lamp which has light-emitting intensity from the visible light range to the infrared range. Also, the infrared cutout filter 12a has the thickness thereof set to d in the direction of the optical axis.

Figure 5:
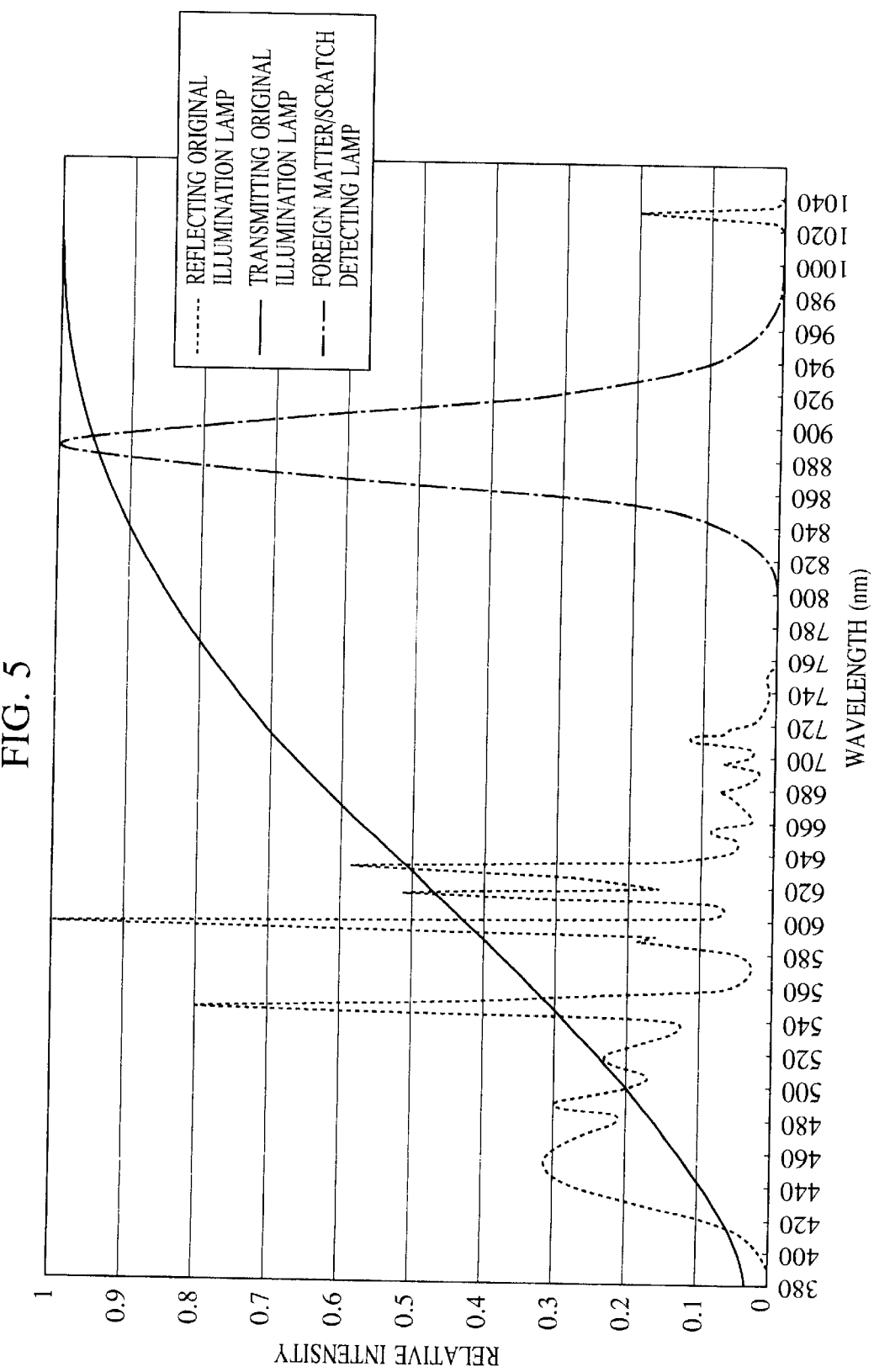
FIG. 5 is a diagram illustrating the spectral intensity distribution of the reflecting original illuminating lamp, transmitting original illuminating lamp, and foreign matter/scratch detecting lamp, according to the second embodiment.

FIG. 5 is a diagram illustrating the spectral intensity distribution of the reflecting original illuminating lamp 4, transmitting original illuminating lamp 5a, and foreign matter/scratch detecting lamp 6, showing the properties of the lamps with a broken line, solid line, and single-dot broken line, respectively.

Incidentally, the spectral transmittance properties of the infrared cutout filter 12a are the same as the spectral transmittance properties of the infrared cutout filter 12 in the first embodiment shown in FIG. 3.

Next, the reading operation of the transmitting original will be described.

In the transmitting original reading mode, first, the reflecting original illuminating lamp 4 shown in FIG. 4 and foreign matter/scratch detecting lamp 6 are turned off, the transmitting original illuminating lamp 5a is turned on, and further, the infrared cutout filter 12a is inserted into the optical path by means of the infrared cutout filter driving device 13. At this time, the illuminating light flux of the transmitting original illuminating lamp 5a passes through the transmitting original 1. The transmitted light flux is scattered uniformly by the scattering plate 3, and the scattered light flux is cast upon the CCD 11 via the mirror 8, roof mirror 9, imaging lens 10, and infrared cutout filter 12a.

As shown in FIG. 5, the light from the transmitting original illuminating lamp 5a contains not only visible light but also an infrared component, but this infrared component is removed by the infrared cutout filter 12a having spectral transmittance properties such as shown in FIG. 3 that has been inserted into the optical path, and so the light which reaches the CCD 11 is only the visible wavelength band component. Consequently, there is no deterioration in contrast due to chromatic aberration from the light source containing the infrared range and visible light range, and image reading with suitable color reproduction can be realized.

Next, the foreign matter/scratch detecting mode will be described.

First, the reflecting original illuminating lamp 4 shown in FIG. 4 and the transmitting original illuminating lamp 5a are turned off, the foreign matter/scratch detecting lamp 6 is turned on, and the infrared cutout filter 12a is retracted from the optical path by means of the infrared cutout filter driving device 13. At this time, the illuminating light flux of the foreign matter/scratch detecting lamp 6 is scattered uniformly by the scattering plate 3, and the scattered light flux passes through the transmitting original 1. The transmitted light flux is cast upon the CCD 11 via the mirror 8, roof mirror 9, and imaging lens 10. Now, as shown in FIG. 5, the light of the foreign matter/scratch detecting lamp 6 is only the infrared component, so the transmitting original 1 such as a negative or positive transmits the infrared component regardless of the image (photosensitive image), so an image of dust, foreign matter, scratches, etc., which physically shield the optical path, is cast on the CCD 11 as a shadow, thereby detecting foreign matter and scratches in a suitable manner.

The foreign matter/scratch detecting image thus obtained and the above-described transmitting original reading image are both subjected to image processing, thereby allowing a suitable image with the effects of foreign matter and scratches removed therefrom to be obtained.

Also, with the present embodiment, particularly setting the thickness d of the infrared cutout filter 12a as described below allows focus deviation, which occurs in infrared image (foreign matter/scratch detecting image) reading and visible light image (transmitting original image) reading, owing to the imaging optical system, to be suitably corrected. Incidentally, the infrared cutout filter 12a is formed by vapor deposition of an infrared cutting material onto plate glass, wherein the above thickness d is the thickness of the plate glass.

Normally, the placement position of the optical axis direction of the CCD is set at a position such that the MTF (Modulation Transfer Function) of the colors R, G, B are at a high average value, so as to ensure a suitable contrast for the read image of the reflecting original or reflecting original. However, with normal lenses, due to the capabilities thereof, axial chromatic aberration on the over side occurs with the infrared light by a substantial amount as compared to the visible light, so the contrast of the infrared read image deteriorates with CCD positioning as determined as described above.

Thus, according to the present embodiment, the thickness d of the infrared cutout filter 12a in the direction of the optical axis is set so as to satisfy the following expression, wherein the difference between the focal position of the CCD 11 for visible light (the placement position of the CCD in the optical axis direction wherein the average of the MTF of the colors R, G, and B is high) and the focal position of the CCD 11 at the peak wavelength in the infrared range of the light from the foreign matter/scratch detecting light source 6 is represented by L, and the refractive index of the infrared cutout filter 12a (e.g., of the e line) is represented by n.

$$L=(1-1/n)d$$

That is to say, the focal position of the CCD 11 for reading reflecting originals or reading transmitting originals (i.e., the CCD focal position for visible light) is corrected on the over side as to the optical axis direction, more specifically, so as to be at the same position as the CCD focal position for foreign matter/scratch detecting reading performed by retracing the infrared cutout filter 12a from the optical path (i.e., the CCD focal position for infrared light).

Thus, suitable contrast (focus) can be obtained for both modes of transmitting (reflecting) original reading and foreign matter/scratch detecting, without changing the position of the optical axis direction for the CCD 11.

Incidentally, on the optical axis of the image reading apparatus, the side toward the CCD 11 from the imaging lens 10 is the image reducing side, and correcting the axial chromatic aberration (focus) between the visible light range and the infrared range by positioning the infrared cutout filter 12a on the optical axis at this image reducing side allows the thickness d of the infrared cutout filter 12a to be made thinner than cases wherein the infrared cutout filter 12a is positioned at the image enlarging side toward the light source from the imaging lens 10, thus having the effect of reducing costs.

Third Embodiment

Figure 6:
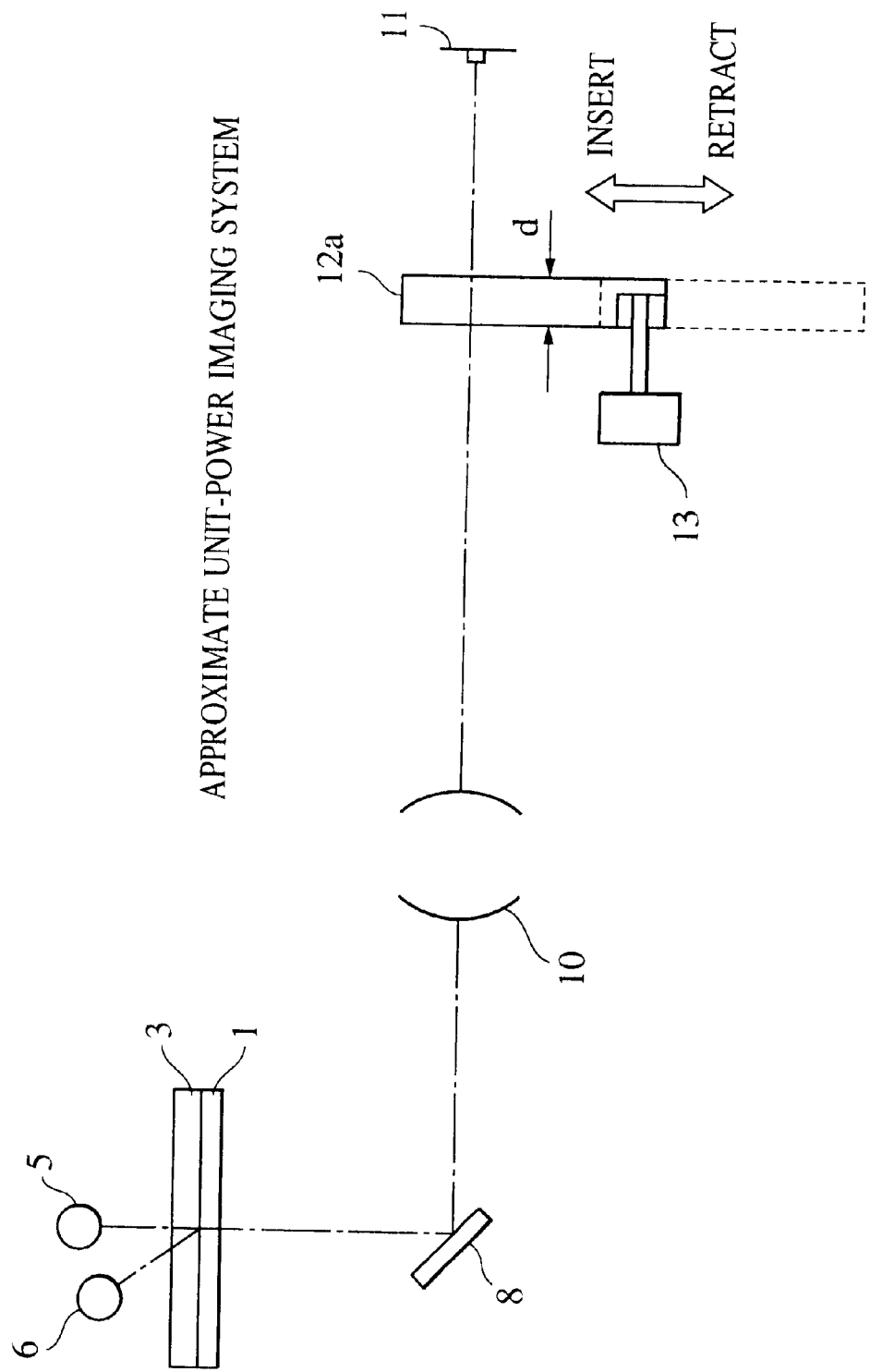
FIG. 6 is a diagram illustrating the configuration of an image reading apparatus according to a third embodiment of the present invention.

FIG. 6 is a diagram illustrating the configuration of an image reading apparatus according to a third embodiment of the present invention. The image reading apparatus according to the third embodiment is a film scanner having an approximate unit-power system for the imaging system. The configuration of the third embodiment is basically the same as the configuration of the second embodiment, so the same components will be denoted with the same reference numerals.

In FIG. 6, reference numeral 1 denotes a transmitting original, 3 denotes a scattering plate, 5 denotes a transmitting original illuminating lamp made up of a fluorescent lamp having light-emitting intensity from the visible light range to the infrared range, 6 denotes a foreign matter/scratch detecting lamp made up of an LED having light-emitting intensity only in the infrared range, 8 denotes a mirror, 10 denotes an imaging lens, 11 denotes a CCD, 12a denotes an infrared cutout filter with a thickness d in the direction of the optical axis, and 13 denotes an infrared cutout filter driving device.

Figure 7:
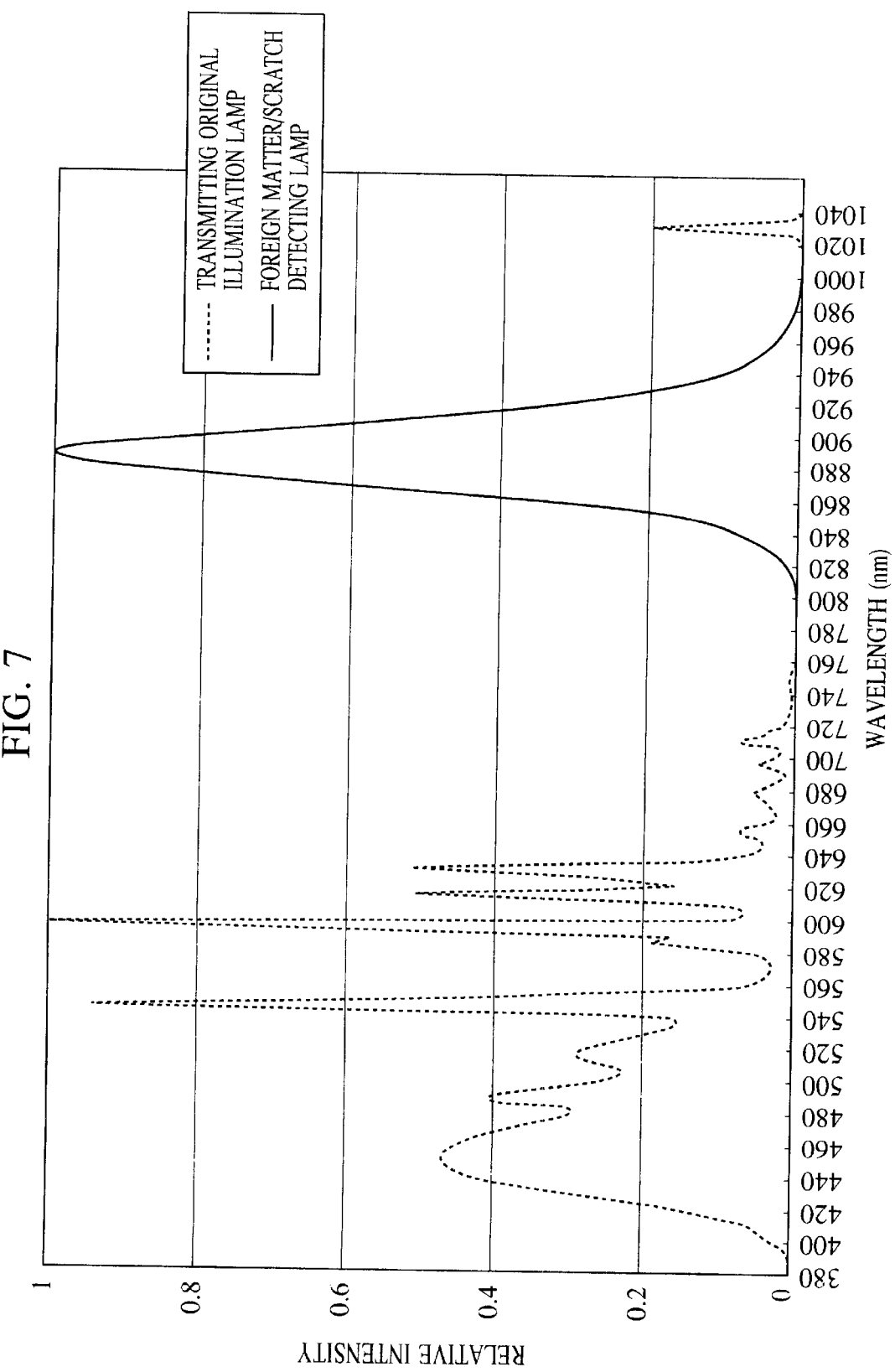
FIG. 7 is a diagram illustrating the spectral intensity distribution of the transmitting original illuminating lamp and foreign matter/scratch detecting lamp, according to the third embodiment.

FIG. 7 is a diagram illustrating the spectral intensity distribution of the transmitting original illuminating lamp 5 and foreign matter/scratch detecting lamp 6, showing the properties of the lamps with a broken line and solid line, respectively.

Incidentally, the spectral transmittance properties of the infrared cutout filter 12a are the same as the spectral transmittance properties of the infrared cutout filter 12 in the first embodiment shown in FIG. 3.

Transparent original reading and foreign matter/scratch detecting is performed with the present embodiment according to the same process as the first embodiment and second embodiment, and good read images are obtained based thereupon.

Fourth Embodiment

As for the infrared cutout filters described in the first through third embodiments, two types are widely known; one is a light interference filter formed by vapor deposition of multiple layers of a dielectric material on the surface of a transparent material, and a light absorbing filter which uses material which absorbs specific wavelengths.

The infrared cutout filter in the image reading apparatuses according to the above embodiments must be extremely thin in order to also have the functions of a focus correcting means. Though the thickness depends on the amount of chromatic aberration peculiar to the imaging lens, a thickness of around 0.5 to 1.2 millimeters is generally necessary to perform focus correction of 850 to 900 nm infrared light and visible light.

Fabricating a light interference filter with such a thin plate may cause bowing of the plate according to the number of vapor-deposition layers and the thickness thereof, which lowers surface precision, and may also lower the reading precision of the visible image. An arrangement wherein glass bowed in the opposite direction beforehand is used to correct the bowing may be employed, but there is the need to polish the glass beforehand, which results in a substantial increase in costs.

Also, the light absorbing filter may be fabricated by applying light absorbing material such as dyes or pigments having light certain absorbing properties onto the surface of the plate glass. Further, light absorbing matter may be mixed into the materials for the glass, to be hardened into a plate.

However, none of these methods facilitate ease of maintaining of a wide area at constant transmittance properties. Also, light absorbing material is expensive, so making infrared cutout filters with wide areas invariably will lead to high costs. Accordingly, the difficulty in making an infrared cutout filter with good surface precision at low costs leads to high costs for the image reading apparatus.

The embodiment described next enables a low-cost image reading apparatus which is capable of suitably reading foreign matter/scratch detecting images.

Figure 8:
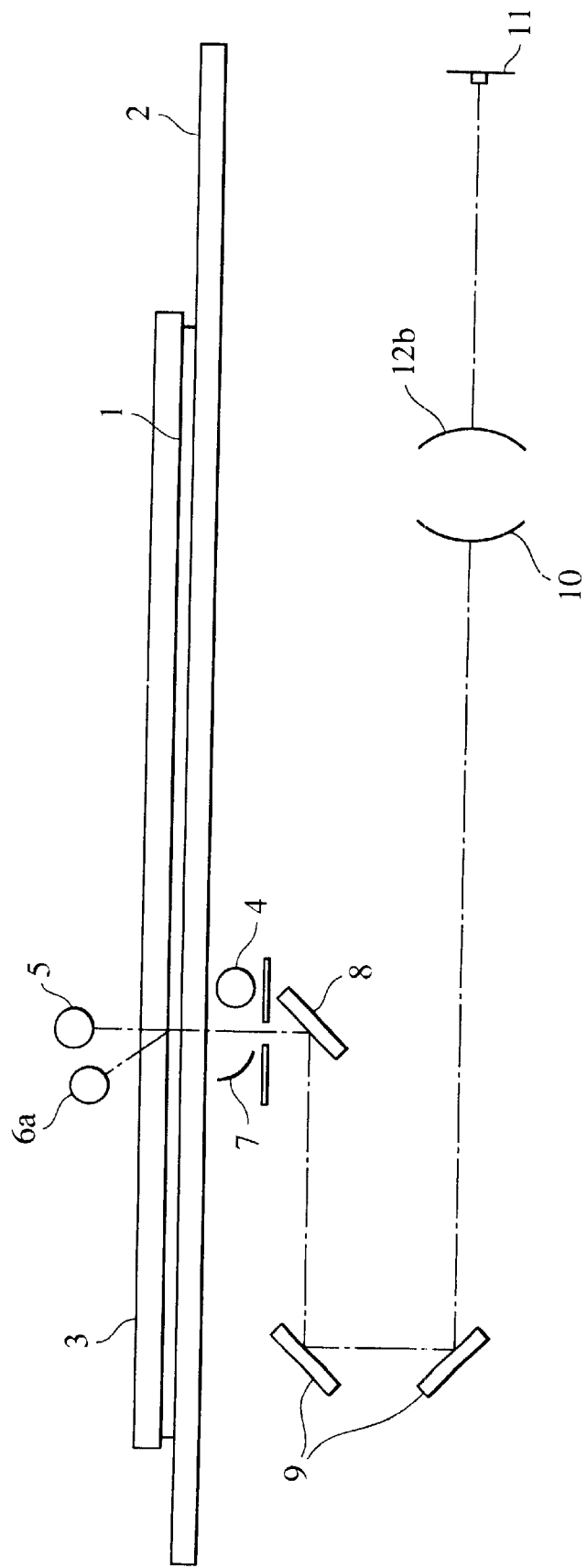
FIG. 8 is a diagram illustrating the configuration of an image reading apparatus according to a fourth embodiment of the present invention.

FIG. 8 is a diagram illustrating the configuration of an image reading apparatus according to a fourth embodiment of the present invention. The configuration of the fourth embodiment is basically the same as the configuration of the first embodiment, so the same components will be denoted with the same reference numerals.

In FIG. 8, reference numeral 1 denotes a transmitting original, 2 denotes an original table glass, 3 denotes a scattering plate, 4 denotes a reflecting original illuminating lamp, 5 denotes a transmitting original illuminating lamp made up of a fluorescent lamp having light-emitting intensity from the visible light range to the infrared range, 6a denotes a foreign matter/scratch detecting lamp made up of an LED having a light-emitting intensity peak at 880 nm wavelength, 7 denotes a reflecting shade, 8 denotes a mirror, 9 denotes a roof mirror, 10 denotes an imaging lens, 11 denotes a CCD, and 12b denotes an infrared cutout filter formed by vapor deposition on a predetermined surface of the imaging lens 10.

Figure 9:
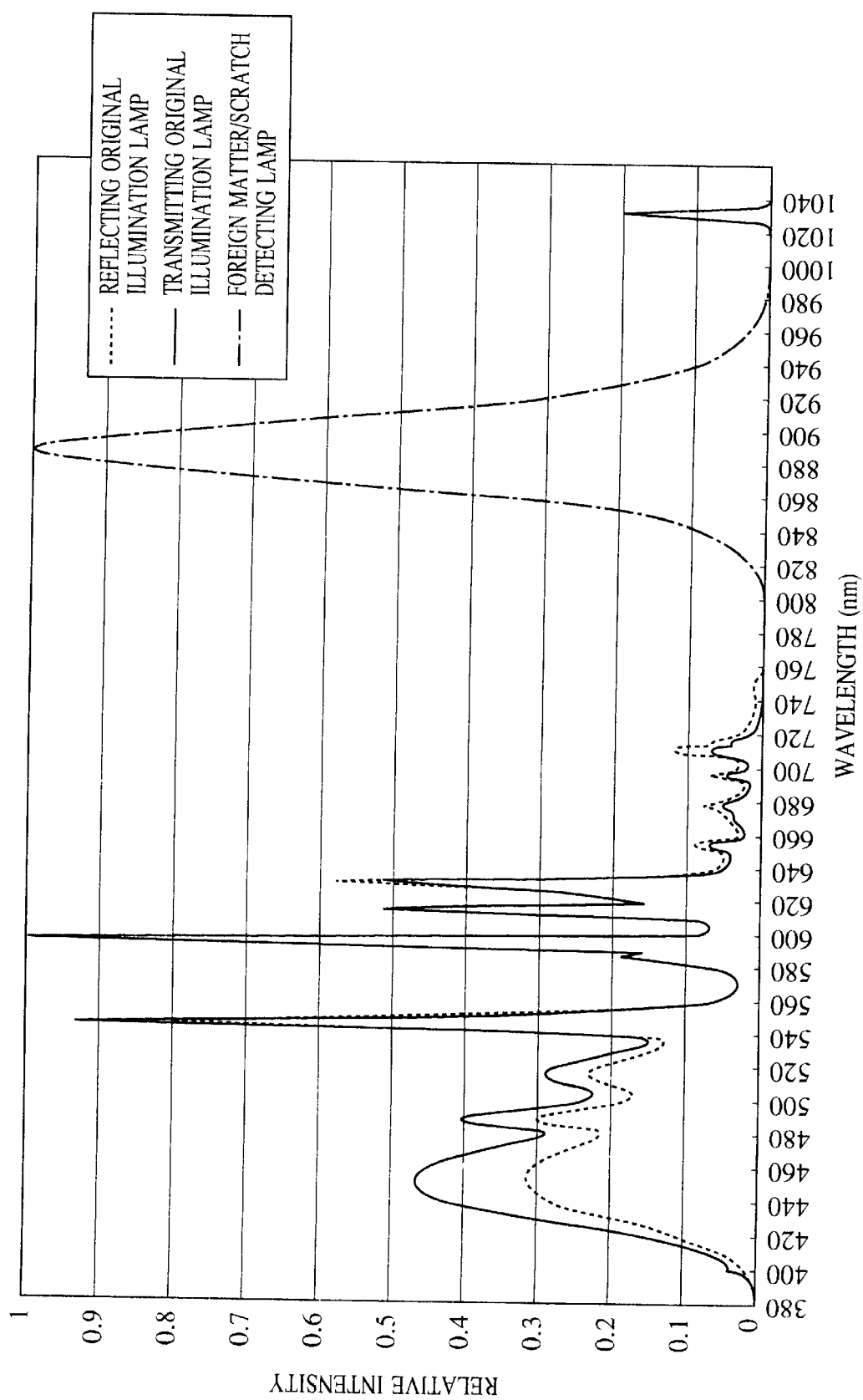
FIG. 9 is a diagram illustrating the spectral intensity distribution of the reflecting original illuminating lamp, transmitting original illuminating lamp, and foreign matter/scratch detecting lamp, according to the fourth embodiment.

FIG. 9 is a diagram illustrating the spectral intensity distribution of the reflecting original illuminating lamp 4, transmitting original illuminating lamp 5, and foreign matter/scratch detecting lamp 6a, showing the properties of the lamps with a broken line, solid line, and single-dot broken line, respectively.

Figure 10:
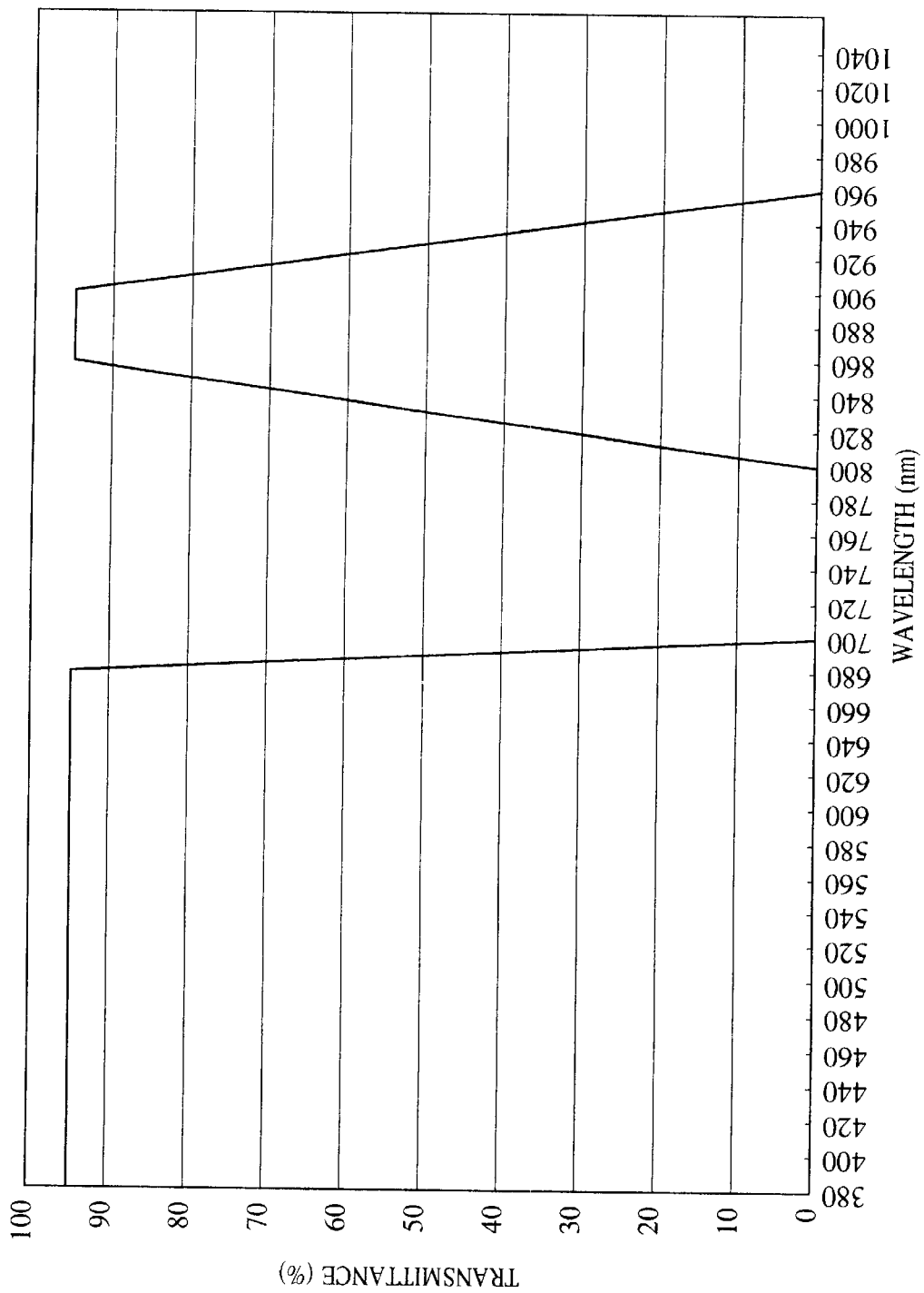
FIG. 10 is a diagram illustrating the spectral transmittance of the infrared cutout filter according to the fourth embodiment.

FIG. 10 is a diagram illustrating the spectral transmittance of the infrared cutout filter 12b.

Next, the reading operation of the transmitting original will be described.

In the transmitting original reading mode, first, the reflecting original illuminating lamp 4 and foreign matter/scratch detecting lamp 6a shown in FIG. 8 are turned off, and the transmitting original illuminating lamp 5 is turned on. At this time, the illuminating light flux of the transmitting original illuminating lamp 5 passes through the transmitting original 1. The transmitted light flux is scattered uniformly by the scattering plate 3, and the scattered light flux is cast upon the CCD 11 via the mirror 8, roof mirror 9, imaging lens 10, and infrared cutout filter 12.

As shown in FIG. 9, the light from the transmitting original illuminating lamp 5 contains not only visible light range but also infrared range components (700 nm through 760 nm and 1020 nm through 1040 nm), but the infrared range component is removed by the infrared cutout filter 12b having spectral transmittance properties such as shown in FIG. 10 that has been created by vapor deposition on a predetermined surface of the imaging lens 10, and so the light which reaches the CCD 11 is only the visible wavelength band component. Consequently, there is virtually no deterioration in contrast due to chromatic aberration owing to the light source containing the infrared range and visible light range, and image reading with suitable color reproduction can be realized.

Next, the foreign matter/scratch detecting mode will be described.

First, the reflecting original illuminating lamp 4 shown in FIG. 8 and the transmitting original illuminating lamp 5 are turned off, and the foreign matter/scratch detecting lamp 6a is turned on. At this time, the illuminating light flux of the foreign matter/scratch detecting lamp 6a having properties such as shown in FIG. 9 is scattered uniformly by the scattering plate 3, and the scattered light flux passes through the transmitting original 1. Here, the infrared cutout filter 12b has enhanced transmittance properties around the 880 nm wavelength area in particular as shown in FIG. 10, so the light passing via the mirror 8, roof mirror 9, and imaging lens 10, is cast upon the CCD 11 without being shielded by the infrared cutout filter 12b formed by vapor deposition on the imaging lens 10.

The illuminating light flux of the foreign matter/scratch detecting lamp 6a is transmitted through the transmitting original 1 such as a negative or positive regardless of the image (photosensitive image), so an image of dust, foreign matter, scratches, etc., which physically shield the optical path, is cast on the CCD 11 as a shadow. Consequently, foreign matter and scratches are detected in a suitable manner.

This foreign matter/scratch detecting image and the above-described transmitting original reading image are used to perform image processing wherein the foreign matter/scratch detecting image is removed from the transmitting original reading image, obtaining a suitable transmitting original image.

For reflecting original reading, the transmitting original illuminating lamp 5 and the foreign matter/scratch detecting lamp 6a are turned off and the reflecting original illuminating lamp 4 is turned on, and a reflecting original reading image is read, whereby a suitable reflecting original image with effects of the infrared component removed therefrom can be obtained, in the same manner as with transmitting originals.

Moreover, the emission wavelength distribution of the fluorescent lamp used for the transmitting original illuminating lamp 5 shows a light emission intensity of approximately zero in the range from around 760 nm to around 1000 nm as shown in FIG. 9, so the peak wavelength for the light of the LED used for the foreign matter/scratch detecting lamp 6a is preferably in the middle of this range.

Fifth Embodiment

Figure 11:
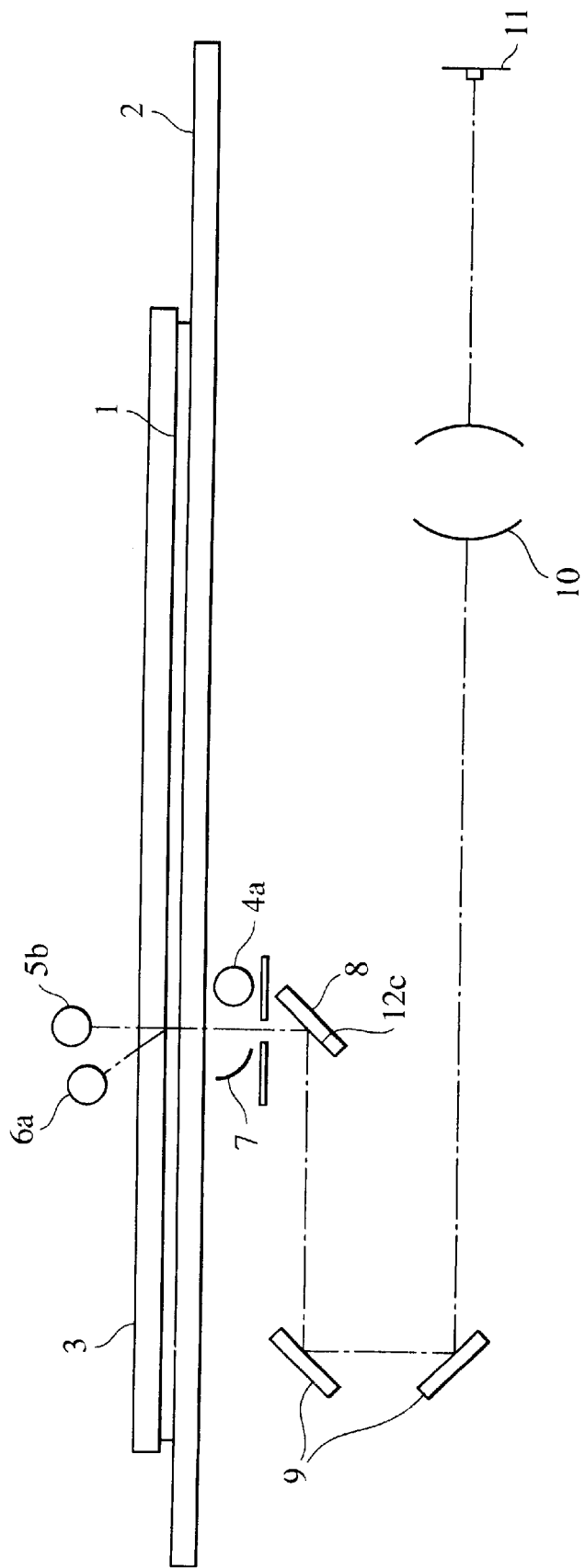
FIG. 11 is a diagram illustrating the configuration of an image reading apparatus according to a fifth embodiment of the present invention.

FIG. 11 is a diagram illustrating the configuration of an image reading apparatus according to a fifth embodiment of the present invention. The configuration of the fifth embodiment is basically the same as the configuration of the fourth embodiment, so the same components will be denoted with the same reference numerals, and description thereof will be omitted.

Figure 12:
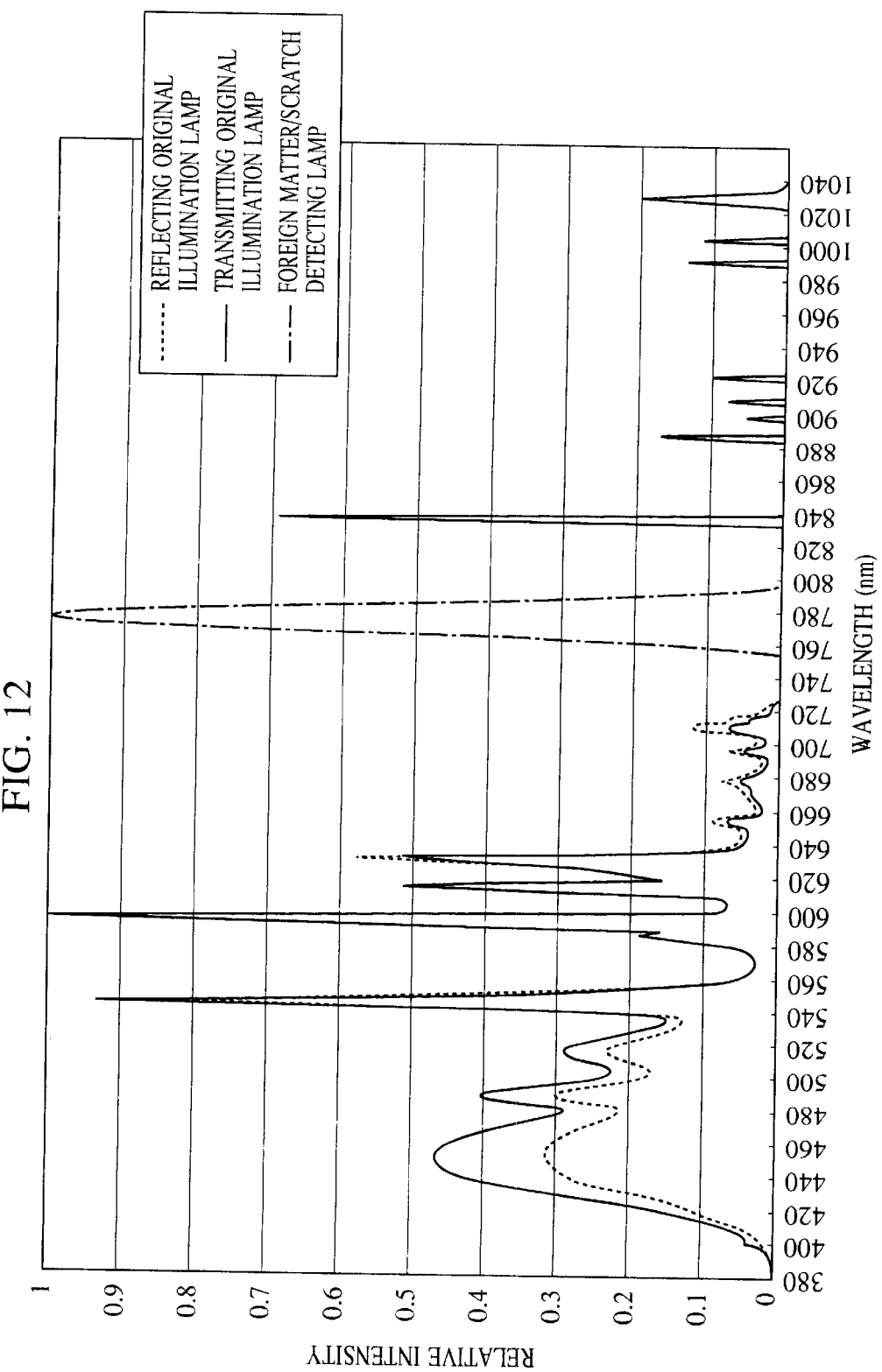
FIG. 12 is a diagram illustrating the spectral intensity distribution of the reflecting original illuminating lamp, transmitting original illuminating lamp, and foreign matter/scratch detecting lamp, according to the fifth embodiment.

With the fifth embodiment, the reflecting original illuminating lamp 4a has a spectral intensity distribution such as shown by the broken line in FIG. 12, and the transmitting original illuminating lamp 5b comprises a fluorescent lamp having light-emitting intensity from the visible light range to the infrared range and has the spectral intensity distribution indicated by the solid line in FIG. 12. Also, reference numeral 12c denotes an infrared cutout filter formed by vapor deposition on a predetermined surface of the mirror 8.

FIG. 12 is a diagram illustrating the spectral intensity distribution of the reflecting original illuminating lamp 4a, transmitting original illuminating lamp 5b, and foreign matter/scratch detecting lamp 6a, showing the properties of the lamps with a broken line, solid line, and single-dot broken line, respectively.

Figure 13:
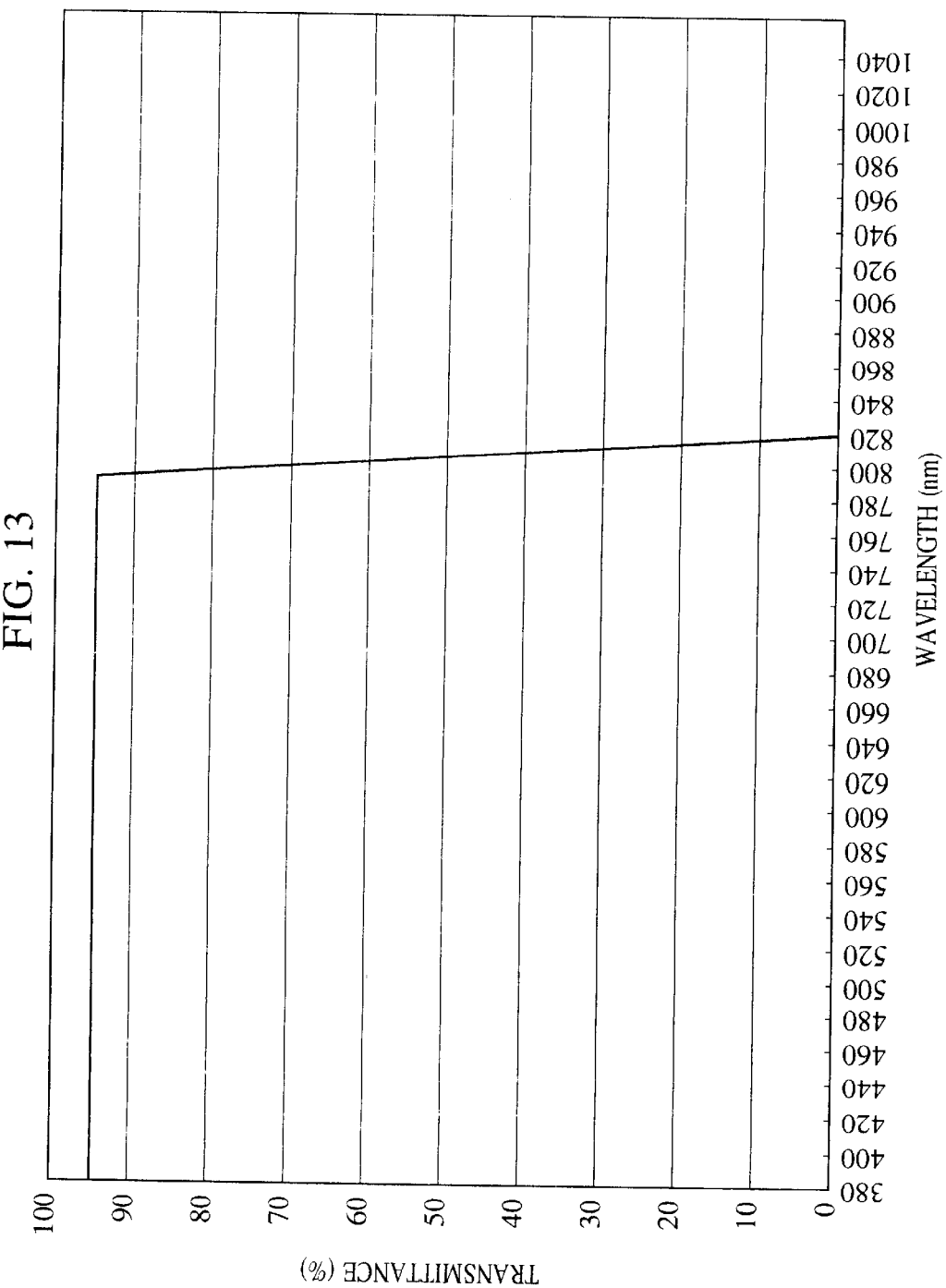
FIG. 13 is a diagram illustrating the spectral transmittance of the infrared cutout filter according to the fifth embodiment.

FIG. 13 is a diagram illustrating the spectral transmittance of the infrared cutout filter 12c.

Next, the reading operation of the transmitting original will be described.

In the transmitting original reading mode, first, the reflecting original illuminating lamp 4a shown in FIG. 11 and the foreign matter/scratch detecting lamp 6a are turned off, and the transmitting original illuminating lamp 5b is turned on. At this time, the illuminating light flux of the transmitting original illuminating lamp 5b passes through the transmitting original 1. The transmitted light flux is scattered uniformly by the scattering plate 3, and the scattered light flux is cast upon the CCD 11 via the mirror 8 upon which is formed the infrared cutout filter 12c by vapor deposition, roof mirror 9, and imaging lens 10. As shown in FIG. 12, the light from the transmitting original illuminating lamp 5 contains not only visible light but also infrared range components (830 nm through 1040 nm), but the infrared range components are removed by the infrared cutout filter 12c having spectral transmittance properties such as shown in FIG. 13 that has been created by vapor deposition onto a predetermined surface of the mirror 8, and so the light which reaches the CCD 11 is only the visible wavelength band component.

Consequently, there is no deterioration in contrast due to chromatic aberration from the light source containing the infrared range and visible light range, and image reading with suitable color reproduction can be realized.

Next, the foreign matter/scratch detecting mode will be described.

First, the reflecting original illuminating lamp 4a and the transmitting original illuminating lamp 5b shown in FIG. 11 are turned off, and the foreign matter/scratch detecting lamp 6a is turned on. At this time, the illuminating light flux of the foreign matter/scratch detecting lamp 6a having properties such as shown in FIG. 12 is scattered uniformly by the scattering plate 3, and the scattered light flux passes through the transmitting original 1. Here, the infrared cutout filter 12c has enhanced transmittance properties up to 820 nm as shown in FIG. 13, so the light transmitted through the transmitting original 1 passes via the mirror 8, roof mirror 9, and imaging lens 10, and is cast upon the CCD 11 without being shielded by the infrared cutout filter 12c created by vapor deposition onto the mirror 8.

The illumination light flux of the foreign matter/scratch detecting lamp 6a is transmitted through the transmitting original 1 such as a negative or positive regardless of the image (photosensitive image), so an image of dust, foreign matter, scratches, etc., which physically shield the optical path, is cast on the CCD 11 as a shadow. Consequently, foreign matter and scratches are detected in a suitable manner.

This foreign matter/scratch detecting image and the above-described transmitting original reading image are used to perform image processing wherein the foreign matter/scratch detecting image is removed from the transmitting original reading image, obtaining a suitable transmitting original image.

For reflecting original reading, the transmitting original illuminating lamp 5b and the foreign matter/scratch detecting lamp 6a are turned off and the reflecting original illuminating lamp 4a is turned on, and a reflecting original reading image is read, whereby a suitable reflecting original image with effects of the infrared component removed therefrom can be obtained, in the same manner as with transmitting originals.

Sixth Embodiment

Figure 14:
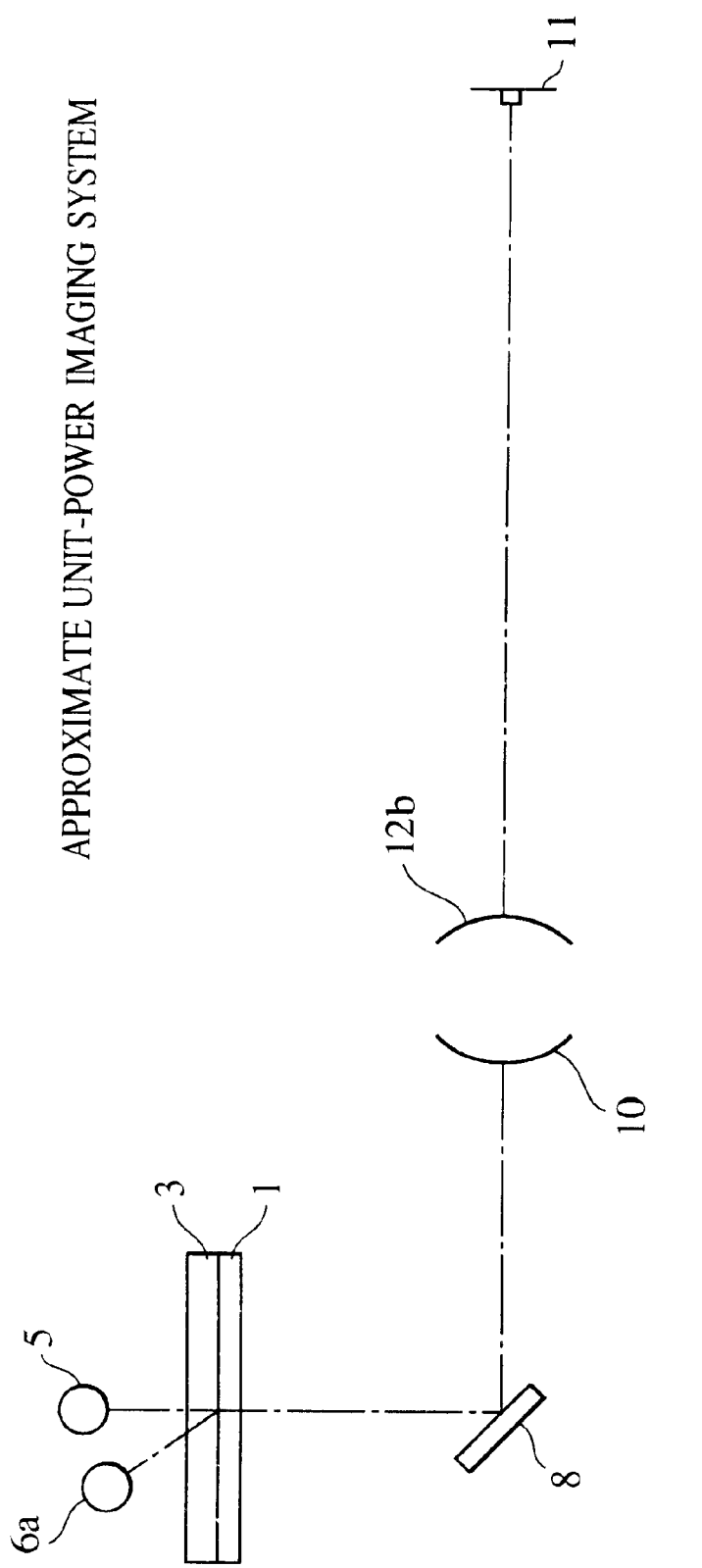
FIG. 14 is a diagram illustrating the configuration of an image reading apparatus according to a sixth embodiment of the present invention.

FIG. 14 is a diagram illustrating the configuration of an image reading apparatus according to a sixth embodiment of the present invention. The image reading apparatus according to the sixth embodiment is a film scanner having an approximate unit-power system for the imaging system. The configuration of the sixth embodiment is basically the same as the configuration of the fourth embodiment, so the same components will be denoted with the same reference numerals.

In FIG. 14, reference numeral 1 denotes a transmitting original, 3 denotes a scattering plate, 5 denotes a transmitting original illuminating lamp made up of a fluorescent lamp having light-emitting intensity from the visible light range to the infrared range, 6a denotes a foreign matter/scratch detecting lamp made up of an LED having a light-emitting intensity peak at 880 nm wavelength, 8 denotes a mirror, 10 denotes an imaging lens, 11 denotes a CCD, and 12b denotes an infrared cutout filter formed by vapor deposition on a predetermined surface of the imaging lens 10.

Figure 15:
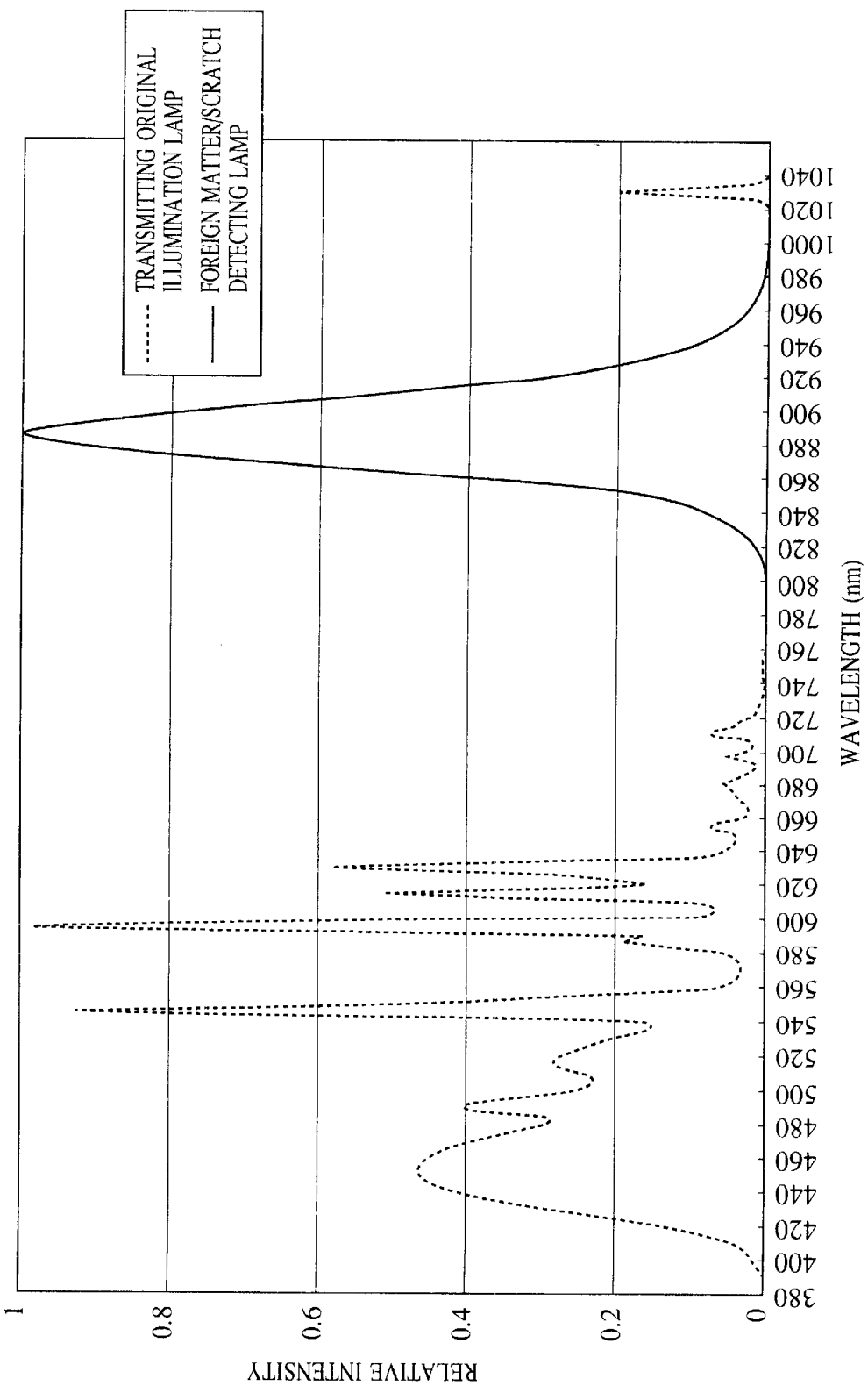
FIG. 15 is a diagram illustrating the spectral intensity distribution of the transmitting original illuminating lamp and foreign matter/scratch detecting lamp, according to the sixth embodiment.

FIG. 15 is a diagram illustrating the spectral intensity distribution of the transmitting original illuminating lamp 5 and the foreign matter/scratch detecting lamp 6a, showing the properties of the lamps with a broken line, and solid line, respectively.

The spectral transmittance properties of the infrared cutout filter 12b are as shown in FIG. 10.

Transparent original reading and foreign matter/scratch detecting is performed with the present embodiment according to the same process as the fourth embodiment, and suitable read images are obtained.

Seventh Embodiment

Figure 16:
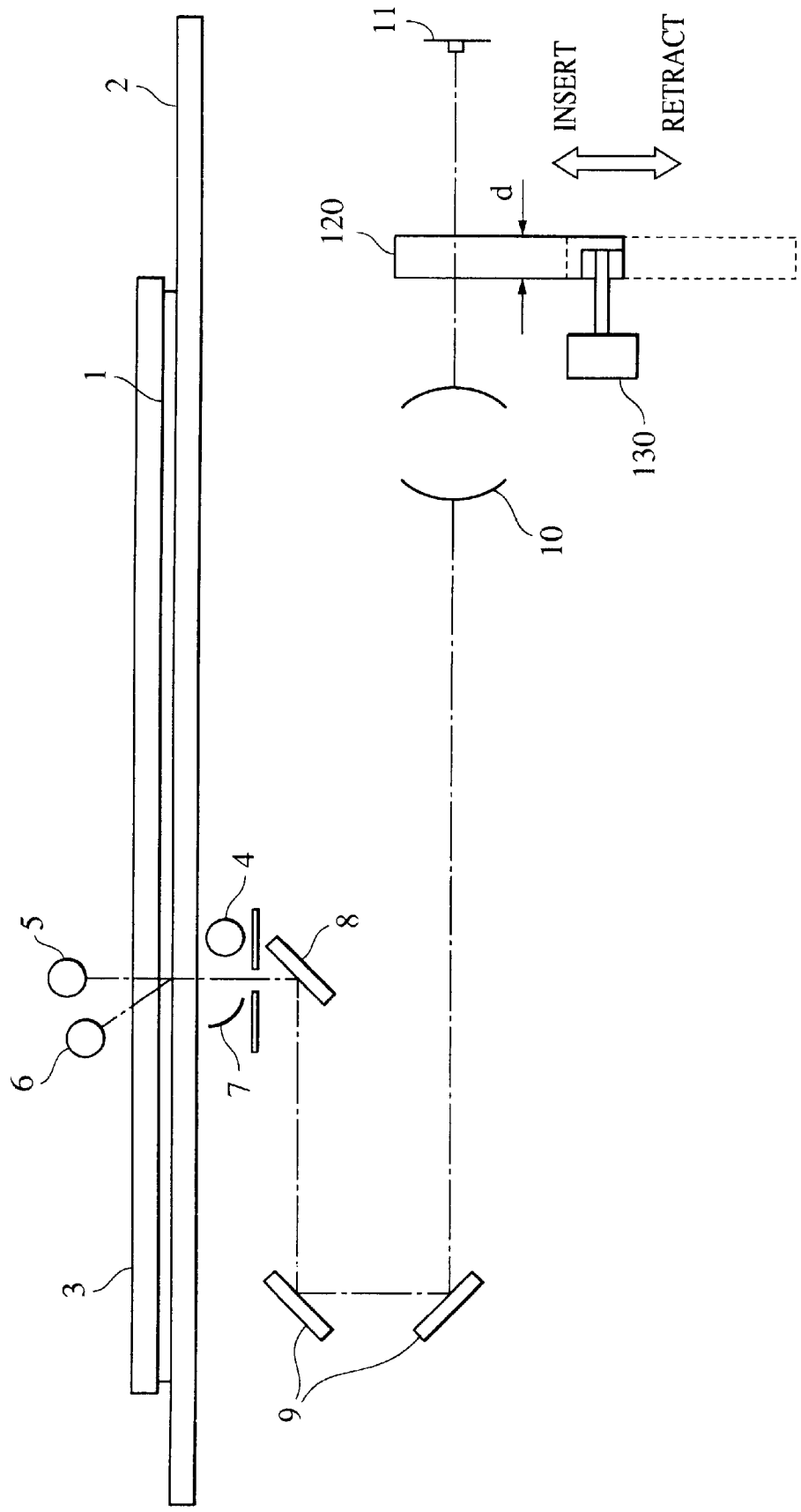
FIG. 16 is a diagram illustrating the configuration of an image reading apparatus according to a seventh embodiment of the present invention.

FIG. 16 is a diagram illustrating the configuration of an image reading apparatus according to a seventh embodiment of the present invention. This image reading apparatus has a 2-to-1 scanning optical system, and can read reflecting originals and transmitting originals.

In FIG. 16, reference numeral 1 denotes a transmitting original, 2 denotes an original table glass, 3 denotes a scattering plate, 4 denotes a reflecting original illuminating lamp, 5 denotes a transmitting original illuminating lamp made up of a fluorescent lamp having light-emitting intensity from the visible light range to the infrared range, 6 denotes a foreign matter/scratch detecting lamp made up of an LED having light-emitting intensity only in the infrared range, 7 denotes a reflecting shade, 8 denotes a mirror, 9 denotes a roof mirror, 10 denotes an imaging lens, 11 denotes a CCD also serving as infrared cutout means, 120 denotes a parallel plate glass serving as focus correcting means, and 130 denotes a driving device. The driving device 130 is for inserting and extracting the parallel plate glass 120 to and from the optical path. The glass 120 is inserted at the predetermined position and orientation each time.

Figure 17:
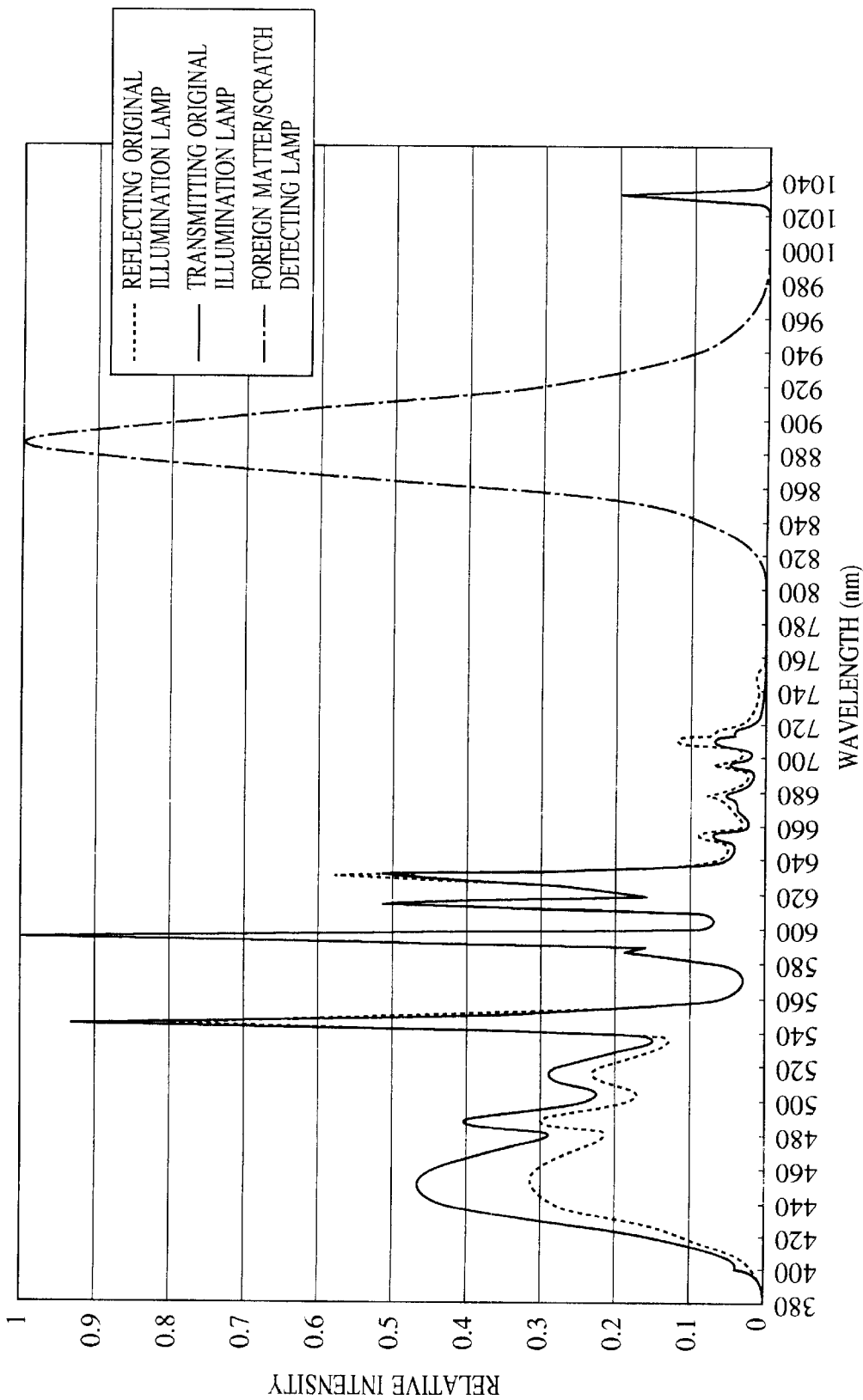
FIG. 17 is a diagram illustrating the spectral intensity distribution of the reflecting original illuminating lamp, transmitting original illuminating lamp, and foreign matter/scratch detecting lamp, according to the seventh embodiment.

FIG. 17 is a diagram illustrating the spectral intensity distribution of the reflecting original illuminating lamp 4, transmitting original illuminating lamp 5, and foreign matter/scratch detecting lamp 6, showing the properties of the lamps with a broken line, solid line, and single-dot broken line, respectively.

Figure 18:
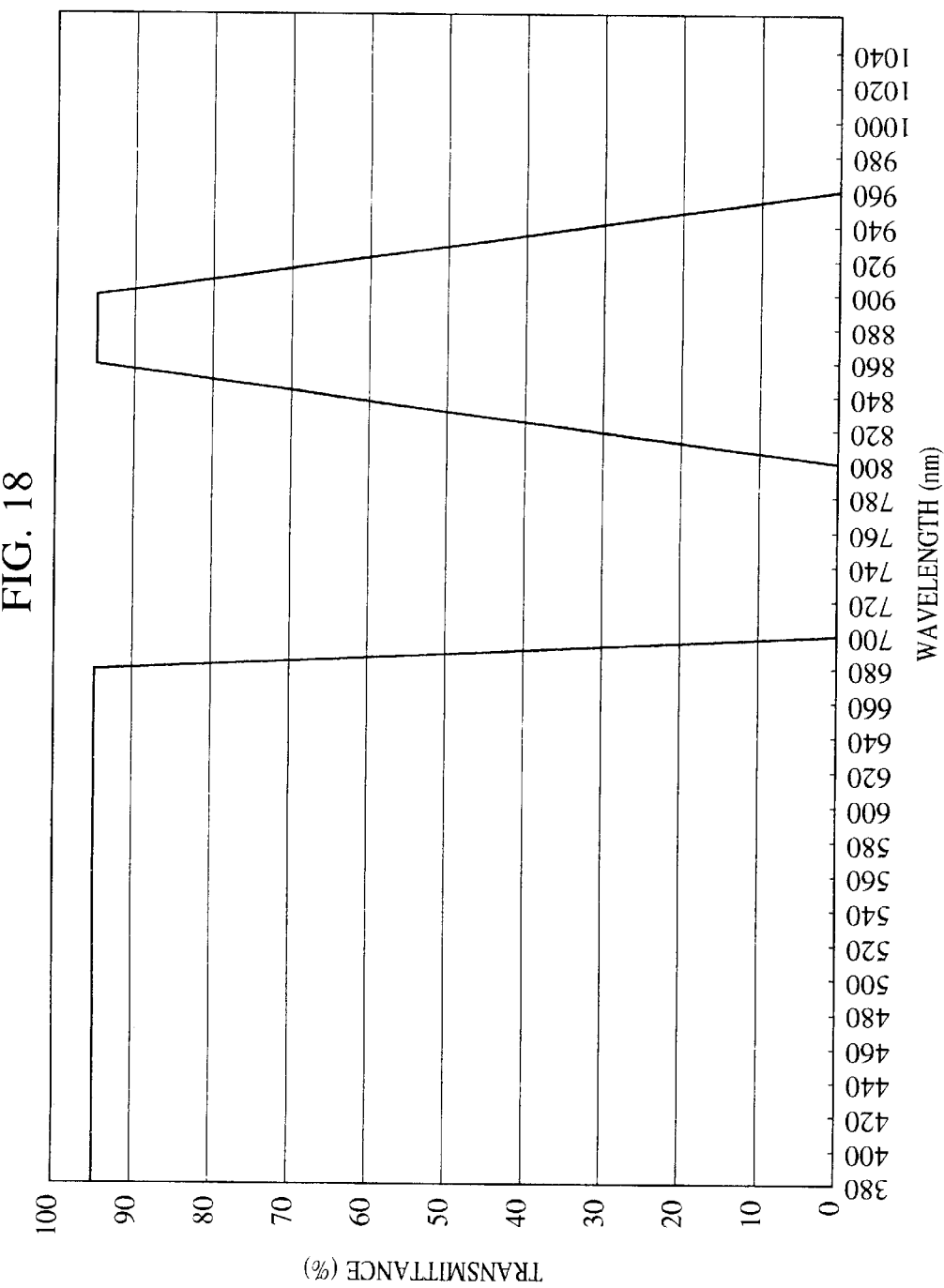
FIG. 18 is a diagram illustrating the spectral transmittance of the infrared cutout filter according to the seventh embodiment.

FIG. 18 is a diagram illustrating the transmittance properties of the infrared cutout means added onto the CCD 11.

These properties can be realized by applying light absorbing material such as dyes or pigments having light certain absorbing properties onto the reading element. The area of application is extremely small in comparison with conventional infrared cutout filters, and accordingly costs can be lowered.

Also, in the event of using a 3-line type CCD having filters for the R, G, and B colors, a simpler configuration can be realized by preparing the light absorbing material such that the transmittance properties of the above filters contain the transmittance properties shown in FIG. 18.

Next, the reading operation of the transmitting original will be described.

In the transmitting original reading mode, first, the reflecting original illuminating lamp 4 shown in FIG. 16 and the foreign matter/scratch detecting lamp 6 are turned off, the transmitting original illuminating lamp 5 is turned on, and further, the parallel plate glass 120 is inserted into the optical path by the driving device 130. At this time, the illuminating light flux of the transmitting original illuminating lamp 5 is scattered uniformly by the scattering plate 3, and the scattered light flux passes through the transmitting original 1. This transmitting light flux is cast upon the CCD 11 via the mirror 8, roof mirror 9, imaging lens 10, and parallel plate glass 120.

As shown in FIG. 17, the light from the transmitting original illuminating lamp 5 contains not only visible light but also an infrared component, but this infrared component is removed by the infrared cutout unit having spectral transmittance properties such as shown in FIG. 3 that has been added to the CCD 11, and so the image signals output from the CCD 11 are only the visible wavelength band component. Consequently, there is no deterioration in contrast due to chromatic aberration from the light source containing the infrared range and visible light range, and image reading with suitable color reproduction can be realized.

Next, the foreign matter/scratch detecting mode will be described.

First, the reflecting original illuminating lamp 4 shown in FIG. 16 and the transmitting original illuminating lamp 5 are turned off, the foreign matter/scratch detecting lamp 6 is turned on, and further the parallel plate glass 120 is retracted from the optical path by means of the driving device 130. At this time, the illuminating light flux of the foreign matter/scratch detecting lamp 6 is scattered uniformly by the scattering plate 3, and the scattered light flux passes through the transmitting original 1. The transmitting light flux is cast upon the CCD 11 via the mirror 8, roof mirror 9, and imaging lens 10.

As shown in FIG. 17, The light of the foreign matter/scratch detecting lamp 6 is only the infrared component around 880 nm, so the transmitting original 1 such as a negative or positive transmits the infrared component regardless of the image (photosensitive image), so an image of dust, foreign matter, scratches, etc., which physically shield the optical path, is cast on the CCD 11 as a shadow. The infrared cutout unit added to the CCD 11 can transmit light around 880 nm as shown in FIG. 3, so information regarding dust, foreign matter, scratches, etc., is output from the CCD 11, thereby detecting foreign matter and scratches in a suitable manner.

The foreign matter/scratch detecting image thus obtained and the above-described transmitting original reading image are both subjected to image processing, thereby allowing a suitable transmitting original image with the effects of foreign matter and scratches removed therefrom to be obtained.

Incidentally, in the event of reflecting original reading, the transmitting original illuminating lamp 5 and the foreign matter/scratch detecting lamp 6 are turned off and the reflecting original illuminating lamp 4 is turned on, and reading is performed in the same manner as with the transmitting original, thereby allowing suitable image reading to be performed with the effects of the infrared component removed.

Also, setting the thickness d of the parallel plate glass 120 as described below allows focus deviation, which occurs in infrared image (foreign matter/scratch detecting image) reading and visible light image (transmitting original image) reading, from the imaging optical system, to be suitably corrected.

That is, normally, the placement position of the optical axis direction of the CCD is set at a position such that the MTF (Modulation Transfer Function) of the colors R, G, B are at a high average value, so as to ensure a suitably contrast for the read image of the reflecting original or transmitting original. However, with normal lenses, due to the capabilities thereof, axial chromatic aberration on the over side occurs with the infrared light by a substantial amount as compared to the visible light, so the contrast of the infrared read image deteriorates with CCD positioning as determined as described above.

Thus, according to the present embodiment, the thickness d of the infrared cutout filter 12a in the direction of the optical axis is set so as to satisfy the following expression, wherein the difference between the focal position of the CCD 11 for visible light (the placement position of the CCD in the optical axis direction wherein the average of the MTF of the colors R, G, and B is high) and the focal position of the CCD 11 at the peak wavelength in the infrared range of the light from the foreign matter/scratch detecting light source 6 is represented by L, and the refractive index of the infrared cutout filter 12a (e.g., of the e line) is represented by n.

$$L=(1-1/n)d$$

That is to say, the focal position of the CCD 11 for reading reflecting originals or reading transmitting originals (i.e., the CCD focal position for visible light) is corrected to the over side as to the optical axis direction, more specifically, so as to be at the same position as the CCD focal position for foreign matter/scratch detecting reading performed by retracting the parallel plate glass 120 from the optical axis (i.e., the CCD focal position for infrared light).

Thus, suitable contrast (focus) can be obtained for both modes of transmitting (reflecting) original reading and foreign matter/scratch detecting, without changing the position of the optical axis direction for the CCD 11.

Incidentally, on the optical axis of the image reading apparatus, the side toward the CCD 11 from the imaging lens 10 is the image reducing side, and correcting the axial chromatic aberration (focus) between the visible light range and the infrared range by positioning the infrared cutout filter 12a on the optical axis at this image reducing side allows the thickness d of the parallel plate glass 120 to be made thinner than cases wherein the infrared cutout filter 12a is positioned at the image enlarging side toward the light source from the imaging lens 10, thus having the effect of greatly reducing costs.

Eighth Embodiment

Figure 19:
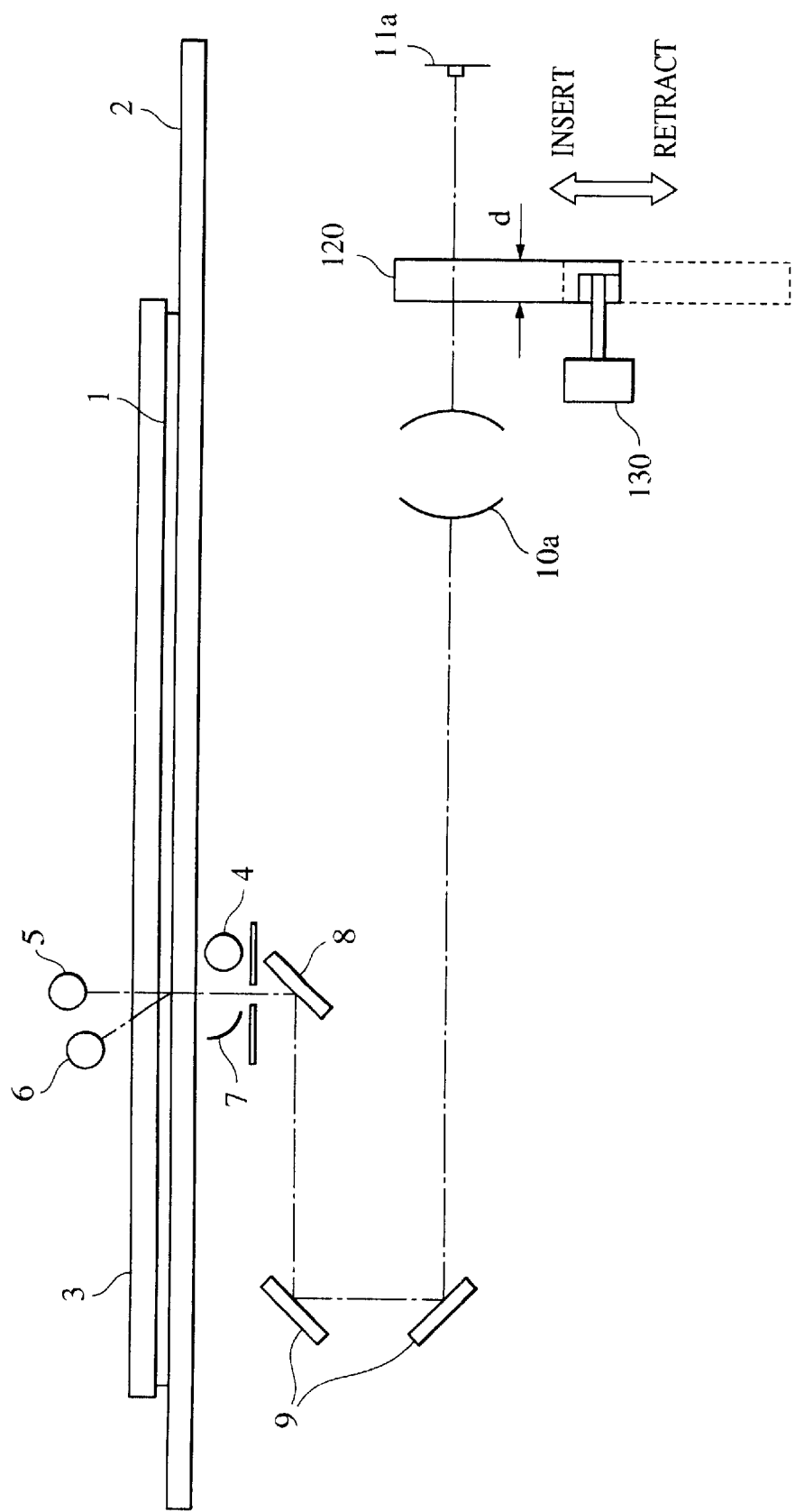
FIG. 19 is a diagram illustrating the configuration of an image reading apparatus according to an eighth embodiment of the present invention.

FIG. 19 is a diagram illustrating the configuration of an image reading apparatus according to an eighth embodiment of the present invention.

The configuration of the eighth embodiment is basically the same as the configuration of the seventh embodiment, so the same components will be denoted with the same reference numerals, and description thereof will be omitted. The eighth embodiment is characterized particularly in that the infrared cutout unit is provided to a predetermined surface within the imaging lens 10a.

Note that the spectral transmittance properties of the infrared cutout means or unit are the same as the spectral transmittance properties of the infrared cutout means or unit in the seventh embodiment shown in FIG. 18.

The transmitting original reading operation and foreign matter/scratch detecting mode are the same as with the seventh embodiment, and thus description thereof will be omitted.

The infrared component of transmitting original illuminating lamp 5 is removed by the infrared cutout means or unit added to the lens 10a, and so the light which reaches the CCD 11a is only the visible wavelength band component. Consequently, there is no deterioration in contrast due to chromatic aberration owing to the light source containing the infrared range and visible light range, and image reading with suitable color reproduction can be realized, similar to the seventh embodiment.

Also, with the present embodiment, the infrared cutout means or unit is provided to a predetermined surface within the lens 10a, but lenses generally are around 1.5 to 10 mm in thickness, so selecting a lens with an appropriate thickness will reduce bowing even in the event that the infrared cutout means or unit is added thereto with the same technique as with fabricating the light interference filter, and surface precision can be maintained at a high level. Accordingly, the desired image reading precision can be obtained. Also, selecting a lens plane near the diaphragm reduces the area for vapor deposition, further reducing costs.

Setting the thickness d of the focus correcting plate so as to be the same as described with the first embodiment allows focus deviation, which occurs in infrared image (foreign matter/scratch detecting image) reading and visible light image (transmitting original image) reading, due to the imaging optical system, to be corrected.

Ninth Embodiment

Figure 20:
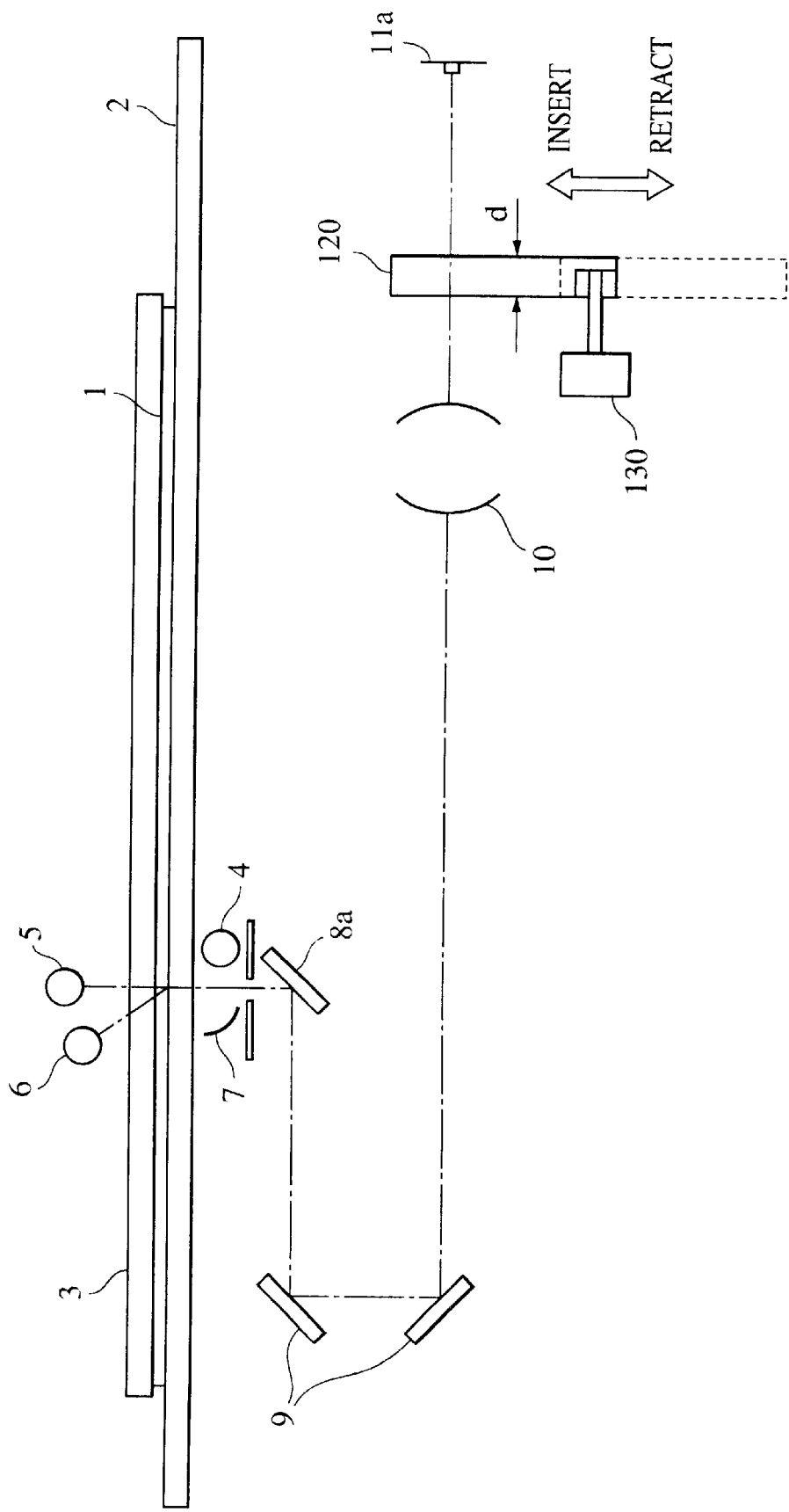
FIG. 20 is a diagram illustrating the configuration of an image reading apparatus according to a ninth embodiment of the present invention.

FIG. 20 is a diagram illustrating the configuration of an image reading apparatus according to a ninth embodiment of the present invention.

The configuration of the ninth embodiment is basically the same as the configuration of the seventh embodiment, so the same components will be denoted with the same reference numerals, and description thereof will be omitted. The ninth embodiment is characterized particularly in that the infrared cutout means or unit is coupled to the reflecting surface of the mirror 8a.

Note that the spectral transmittance properties of the infrared cutout means or unit are the same as the spectral transmittance properties of the infrared cutout means or unit in the seventh embodiment shown in FIG. 18. The transmitting original reading operation and foreign matter/scratch detecting mode are the same as with the seventh embodiment, and thus description thereof will be omitted.

The infrared component of transmitting original illuminating lamp 5 is removed by the infrared cutout means added to the mirror 8a, and so the light which reaches the CCD 11a is only the visible wavelength band component. Consequently, there is no deterioration in contrast due to chromatic aberration from the light source containing the infrared range and visible light range, and image reading with suitable color reproduction can be realized, similar to the first embodiment.

Also, with the present embodiment, the infrared cutout means or unit is coupled to the reflecting surface of the mirror 8a. Mirrors generally are around 3 to 5 mm in thickness, so bowing is small even in the event that the infrared cutout means or unit is added thereto with the light interference filter, and surface precision can be maintained at a high level. Accordingly, the desired image reading precision can be obtained.

Setting the thickness d of the focus correcting plate so as to be the same as described with the seventh embodiment allows focus deviation, which occurs in infrared image (foreign matter/scratch detecting image) reading and visible light image (transmitting original image) reading, from the imaging optical system, to be suitably corrected.

Tenth Embodiment

Figure 21:
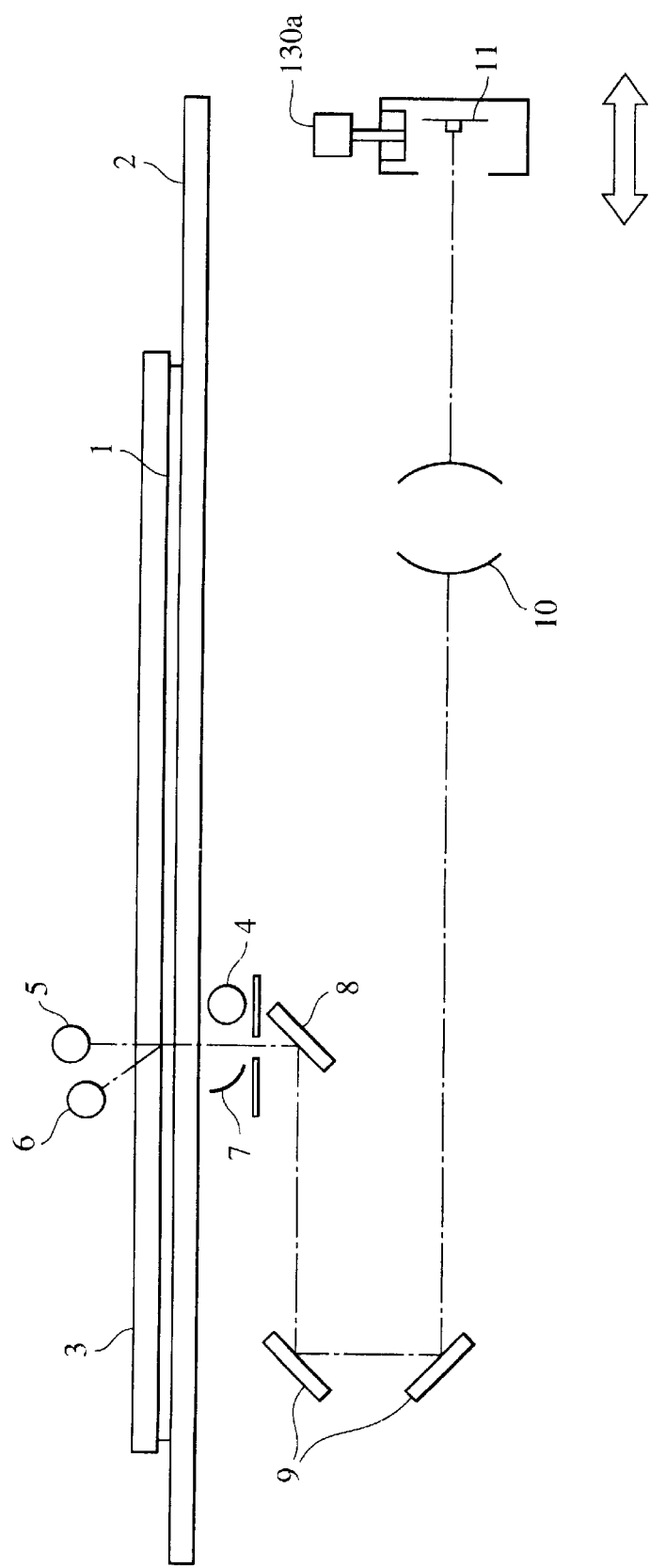
FIG. 21 is a diagram illustrating the configuration of an image reading apparatus according to a tenth embodiment of the present invention.

FIG. 21 is a diagram illustrating the configuration of an image reading apparatus according to a tenth embodiment of the present invention.

The configuration of the tenth embodiment is basically the same as the configuration of the seventh embodiment, so the same components will be denoted with the same reference numerals, and description thereof will be omitted. The tenth embodiment is characterized particularly in that the driving device 130a as focus collecting means has functions for moving the CCD 11 forwards and backwards in the direction of the optical axis by a predetermined amount.

Next, the reading operation of the transmitting original will be described.

In the transmitting original reading mode, first, the reflecting original illuminating lamp 4 shown in FIG. 21 and the foreign matter/scratch detecting lamp 6 are turned off, the transmitting original illuminating lamp 5 is turned on, and the driving device 130a moves the CCD 11 to a position where a good contrast (focus) can be obtained for the visible image. At this time, the illuminating light flux of the transmitting original illuminating lamp 5 is scattered uniformly by the scattering plate 3, and the scattered light flux passes through the transmitting original 1. The transmitted light flux is cast upon the CCD 11 via the mirror 8, roof mirror 9, and imaging lens 10.

The infrared range component of the transmitting original illuminating lamp 5 is removed by the infrared cutout means or unit added to the CCD 11, and so the image signals output from the CCD 11 are only the visible wavelength band component. Consequently, there is no deterioration in contrast due to chromatic aberration from the light source containing the infrared range and visible light range, and image reading with suitable color reproduction can be realized, similar to the first embodiment.

Next, the foreign matter/scratch detecting mode will be described.

First, the reflecting original illuminating lamp 4 shown in FIG. 21 and the transmitting original illuminating lamp 5 are turned off, the foreign matter/scratch detecting lamp 6a is turned on, and the driving device 130a moves the CCD 11 to a position where a good contrast (focus) can be obtained for the infrared image. At this time, the illuminating light flux of the foreign matter/scratch detecting lamp 6 is scattered uniformly by the scattering plate 3, and the scattered light flux passes through the transmitting original 1. The transmitted light flux passes via the mirror 8, roof mirror 9, and imaging lens 10, and is cast upon the CCD 11.

Eleventh Embodiment

Figure 22:
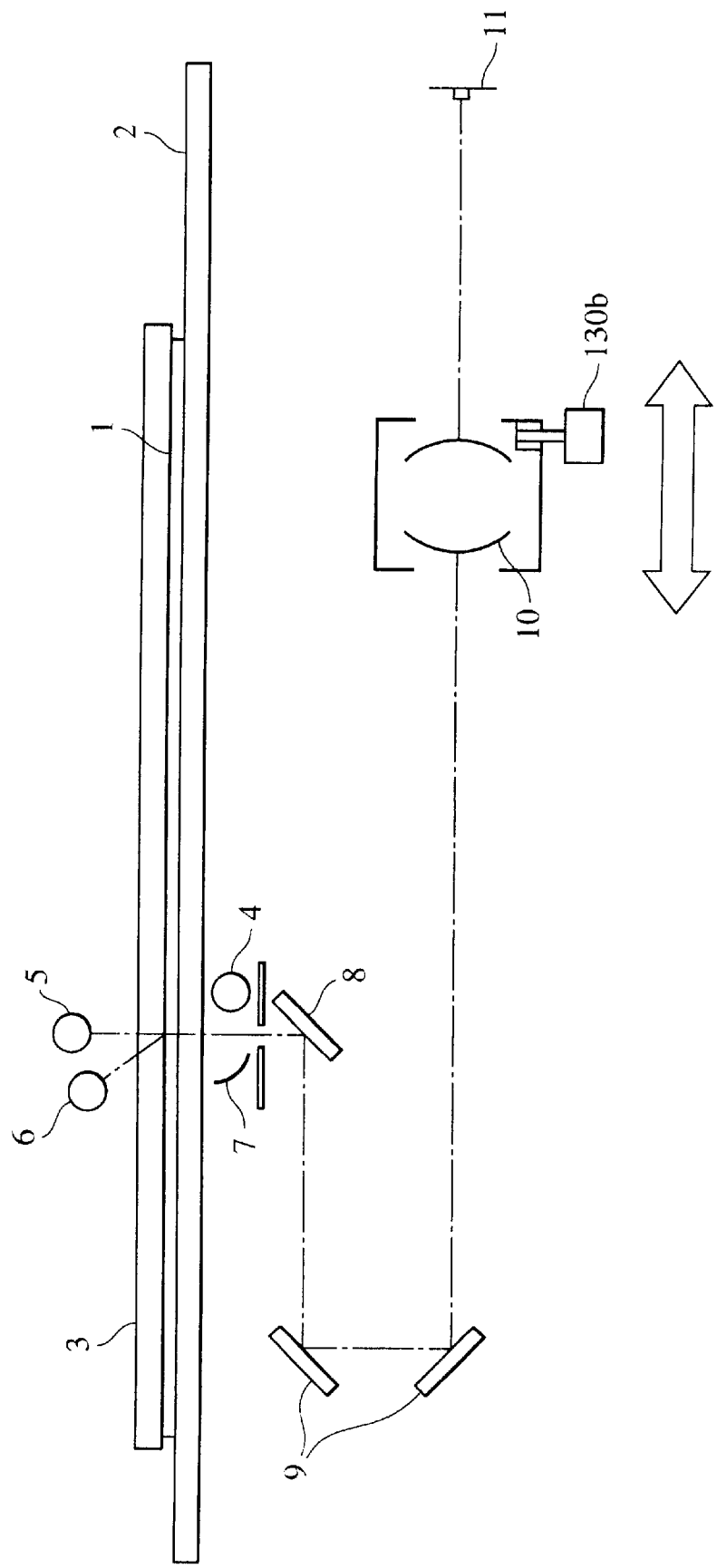
FIG. 22 is a diagram illustrating the configuration of an image reading apparatus according to an eleventh embodiment of the present invention.
Figure 23:
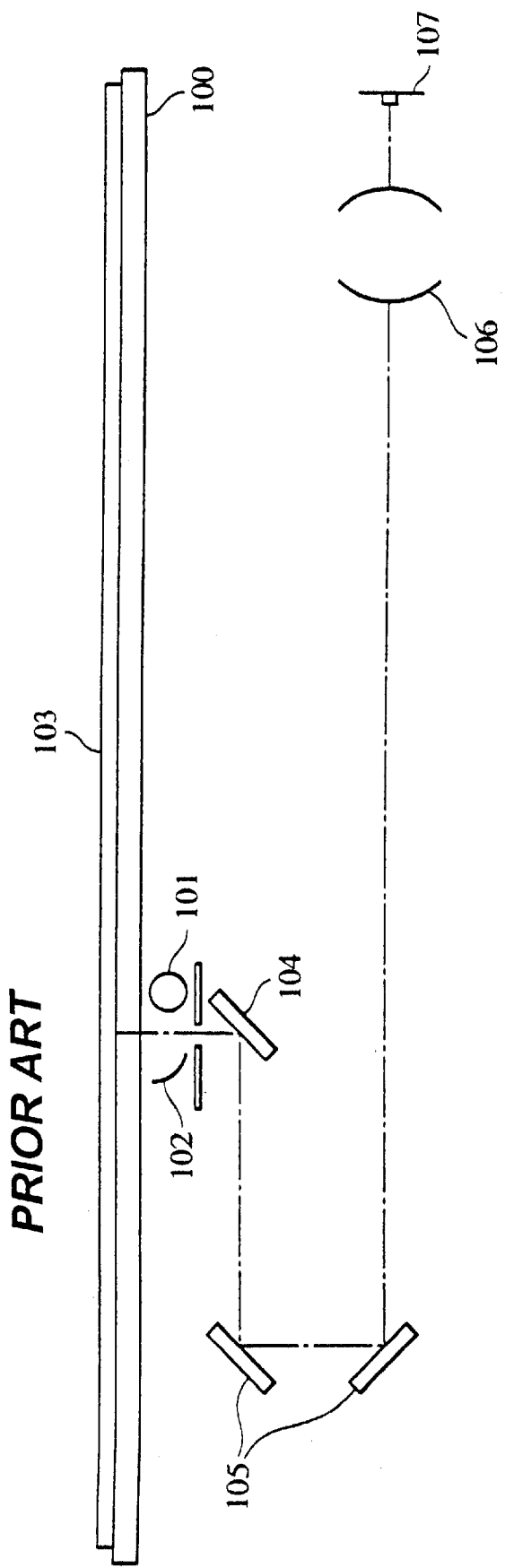
FIG. 23 is a diagram illustrating the schematic configuration of a conventional image reading apparatus.
Figure 24:
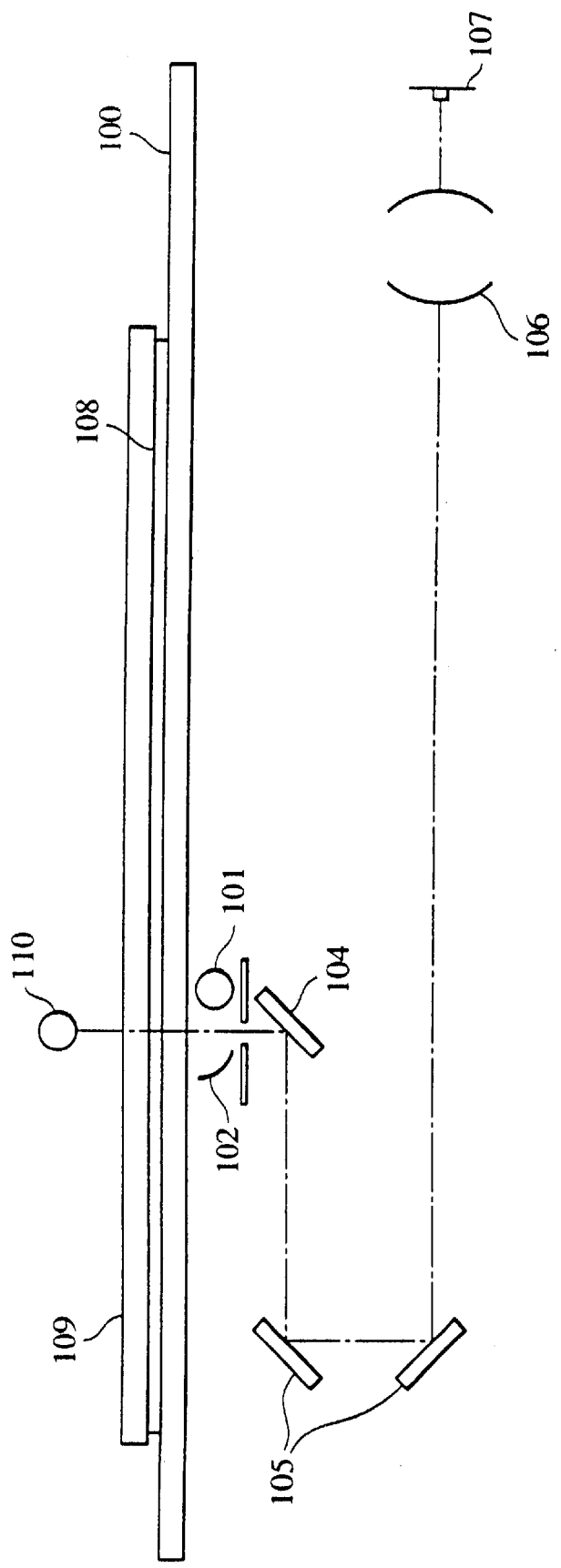
FIG. 24 is a diagram illustrating the schematic configuration of a conventional image reading apparatus for reading transmitting originals.
Figure 25:
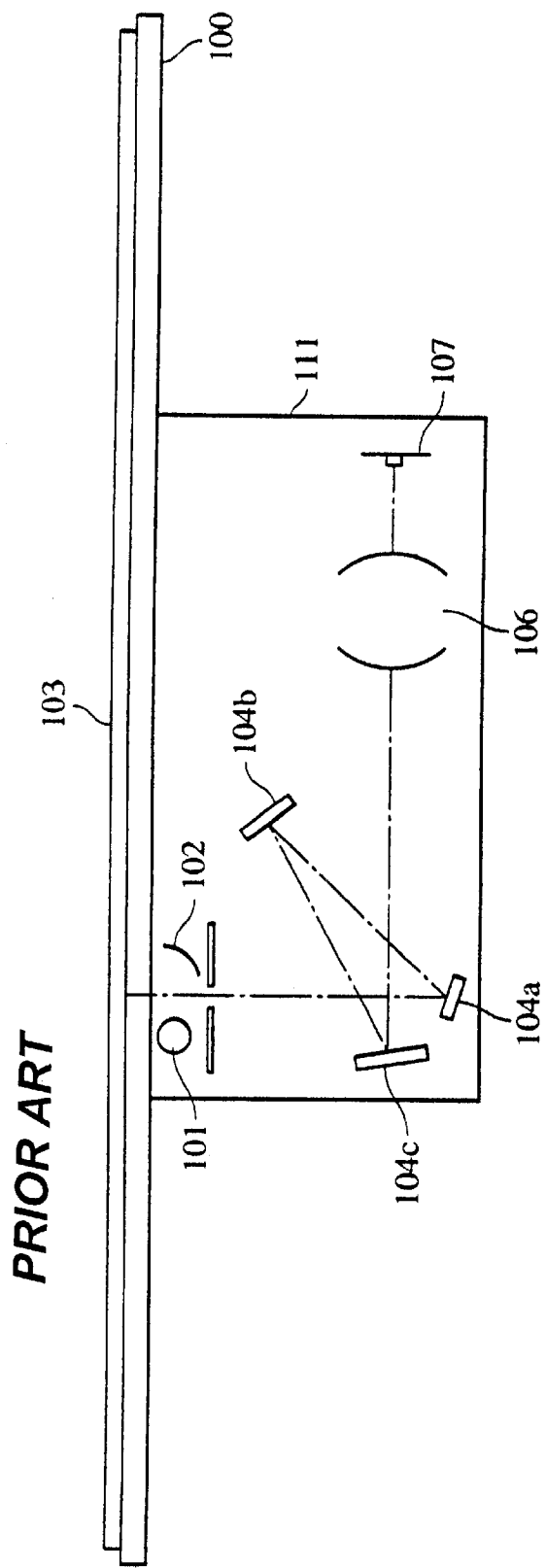
FIG. 25 is a diagram illustrating the schematic configuration of a conventional image reading apparatus with an integrated optical system for reading reflecting originals.
Figure 26:
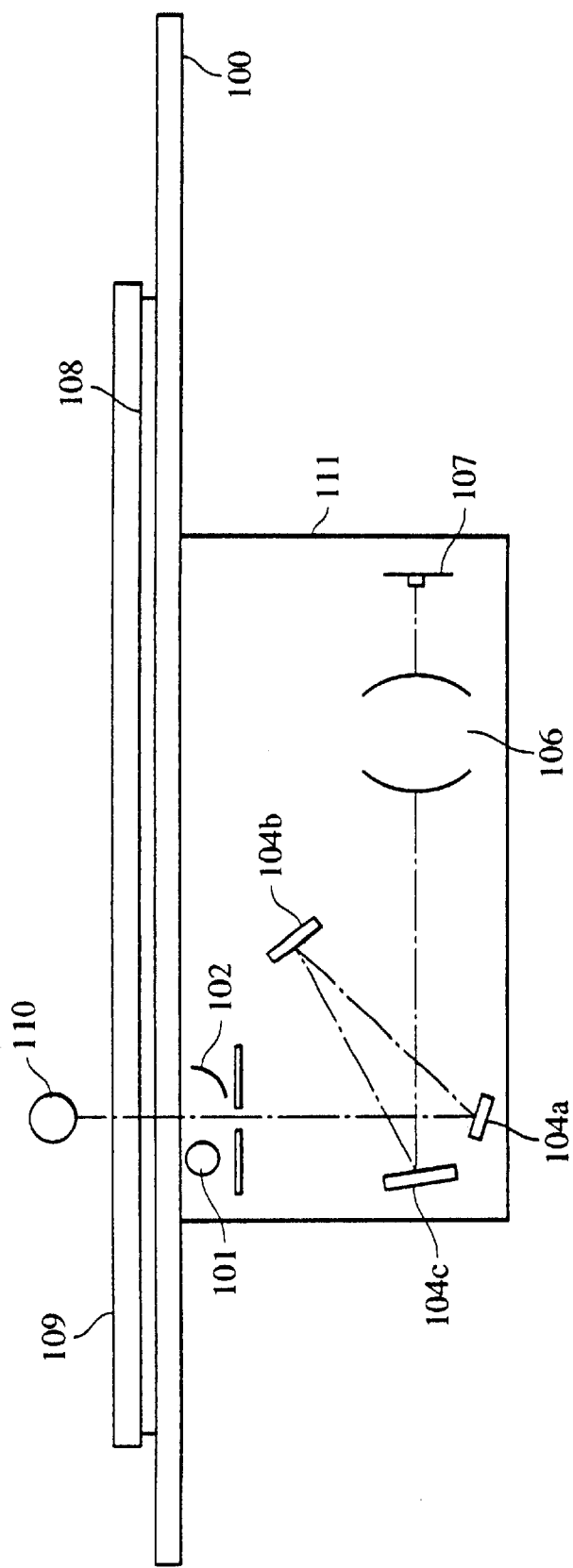
FIG. 26 is a diagram illustrating the schematic configuration of a conventional image reading apparatus with an integrated optical system for reading transmitting originals.
Figure 27:
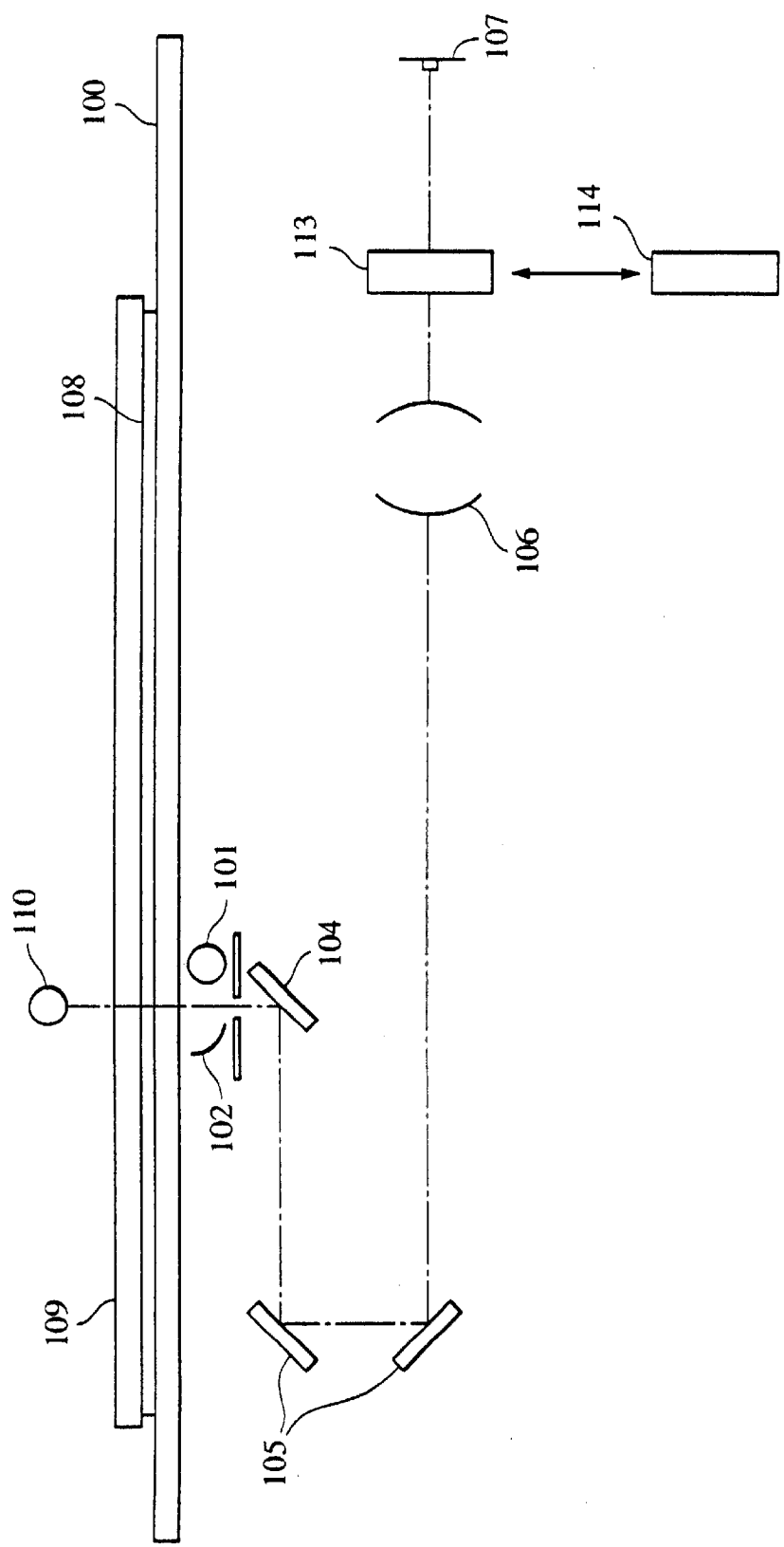
FIG. 27 is a diagram illustrating a first conventional foreign matter/scratch detecting apparatus.
Figure 28:
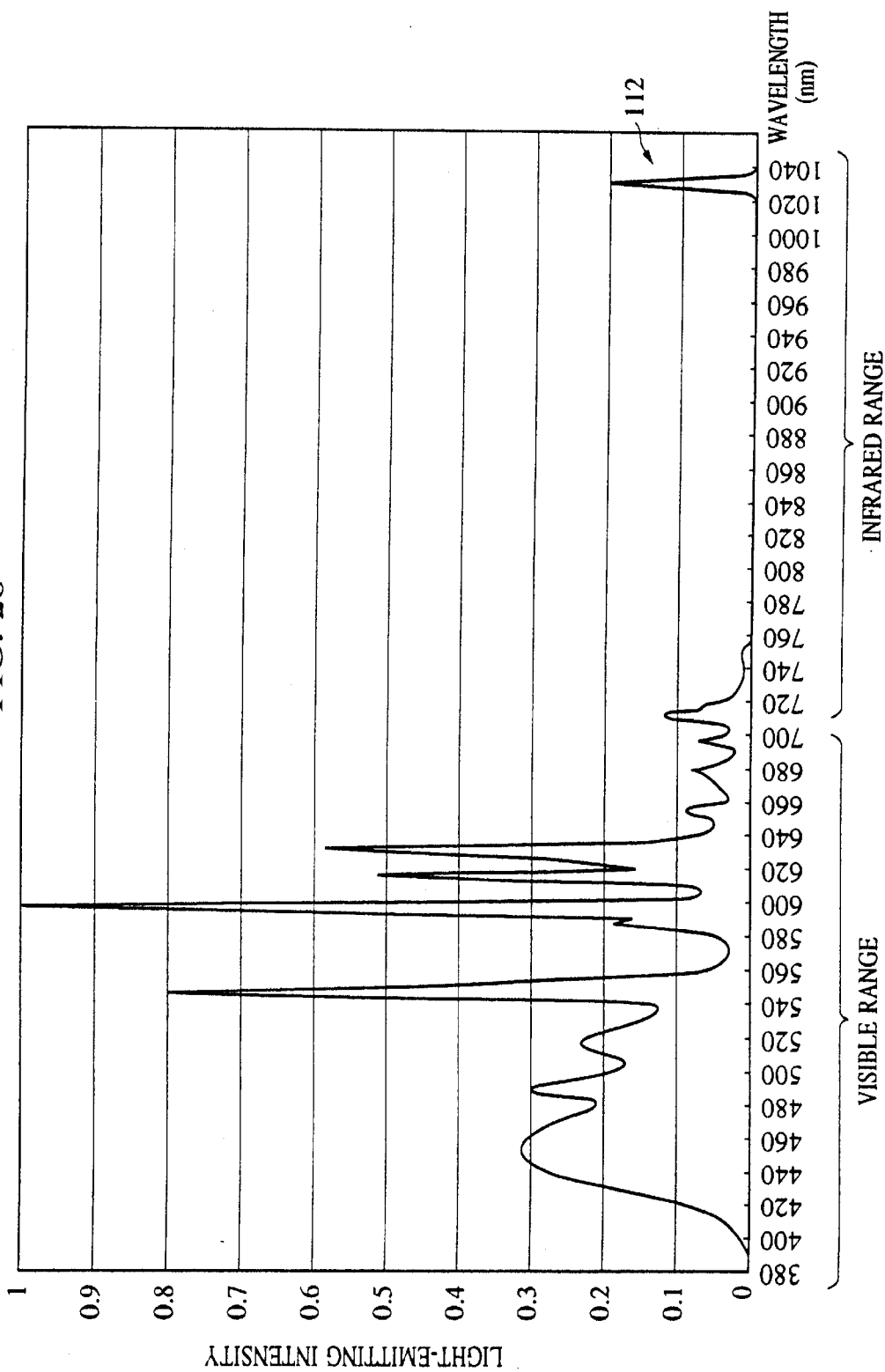
FIG. 28 is a diagram illustrating the spectral intensity distribution properties of the transmitting original illuminating lamp in the first foreign matter/scratch detecting apparatus.
Figure 29:
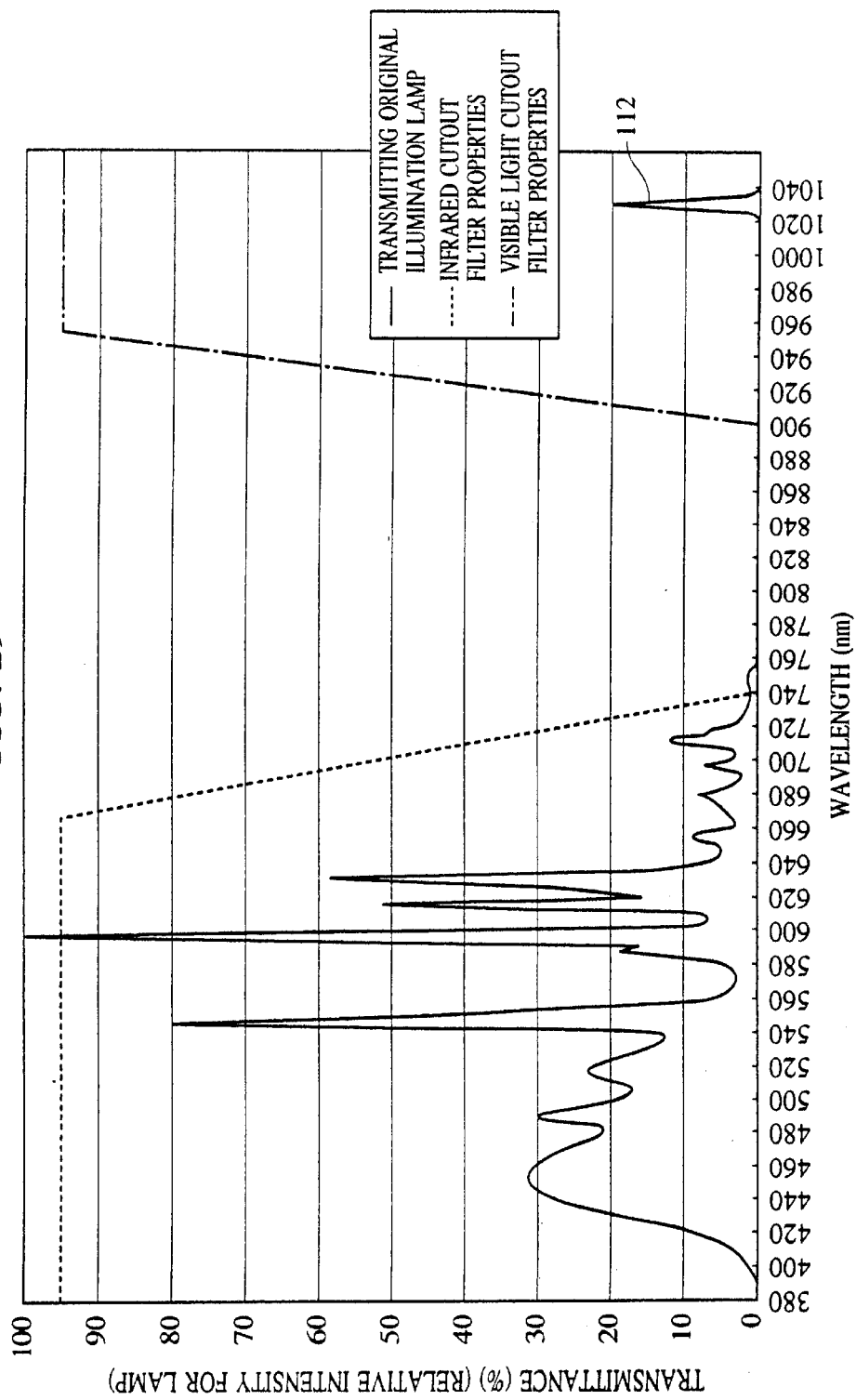
FIG. 29 is a diagram illustrating the spectral transmittance of the infrared cutout filter and visible light cutout filter in the first foreign matter/scratch detecting apparatus, and also illustrating the relative spectral intensity of the transmitting original illuminating lamp.
Figure 30:
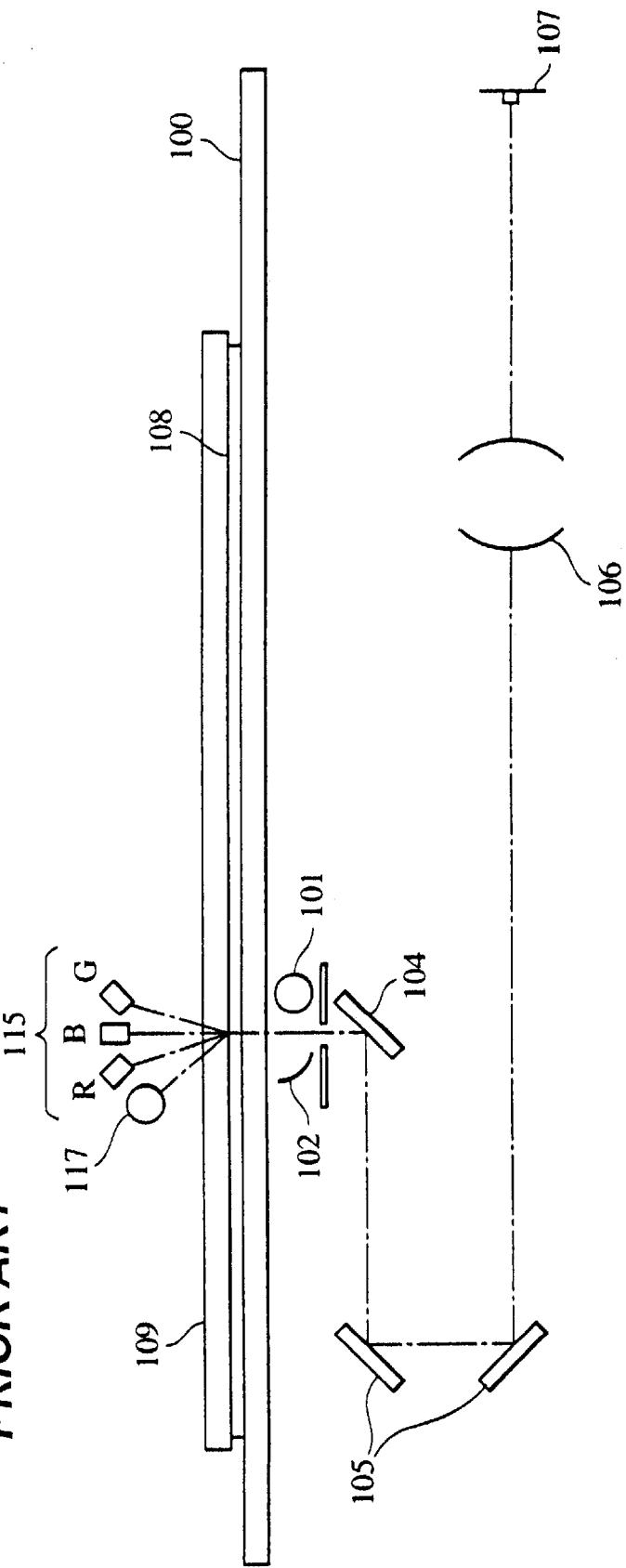
FIG. 30 is a diagram illustrating a second conventional foreign matter/scratch detecting apparatus.
Figure 31:
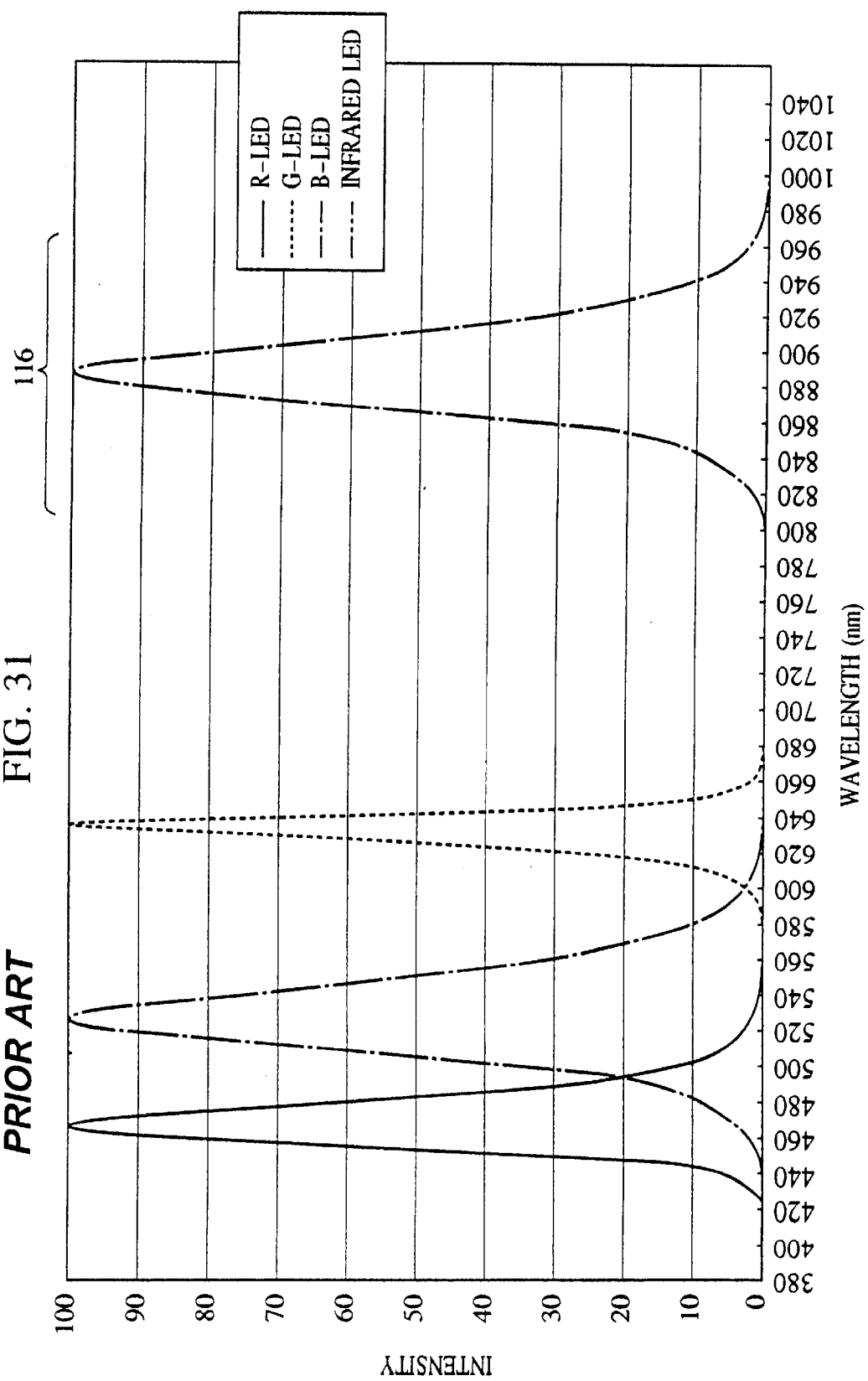
FIG. 31 is a diagram illustrating the light-emitting intensity properties of the LED and foreign matter/scratch detecting light source in the second foreign matter/scratch detecting apparatus.

FIG. 22 is a diagram illustrating the configuration of an image reading apparatus according to an eleventh embodiment of the present invention.

The configuration of the eleventh embodiment is basically the same as the configuration of the fourth embodiment, so the same components will be denoted with the same reference numerals, and description thereof will be omitted. The eleventh embodiment is characterized particularly in that the driving device 130b as focus collecting means has functions for moving the imaging lens 10 forwards and backwards in the direction of the optical axis by a predetermined amount.

Next, the reading operation of the transmitting original will be described.

In the transmitting original reading mode, first, the reflecting original illuminating lamp 4 shown in FIG. 22 and the foreign matter/scratch detecting lamp 6 are turned off, the transmitting original illuminating lamp 5 is turned on, and the driving device 130b moves the imaging lens 10 to a position where a good contrast (focus) can be obtained for the visible image. At this time, the illuminating light flux of the transmitting original illuminating lamp 5 is scattered uniformly by the scattering plate 3, and the scattered light flux passes through the transmitting original 1. The transmitted light flux is cast upon the CCD 11 via the mirror 8, roof mirror 9, and imaging lens 10.

The infrared component of the transmitting original illuminating lamp 5 is removed by the infrared cutout means or unit added to the CCD 11, and so the image signals output from the CCD 11 are only the visible wavelength band component. Consequently, there is no deterioration in contrast due to chromatic aberration from the light source containing the infrared range and visible light range, and image reading with suitable color reproduction can be realized, similar to the first embodiment.

Next, the foreign matter/scratch detecting mode will be described.

First, the reflecting original illuminating lamp 4 shown in FIG. 22 and the transmitting original illuminating lamp 5 are turned off, the foreign matter/scratch detecting lamp 6 is turned on, and the driving device 130b moves the imaging lens 10 to a position where a good contrast (focus) can be obtained for the infrared image. At this time, the illuminating light flux of the foreign matter/scratch detecting lamp 6 is scattered uniformly by the scattering plate 3, and the scattered light flux passes through the transmitting original 1. The scattered light flux passes via the mirror 8, roof mirror 9, and imaging lens 10, and is cast upon the CCD 11.

The infrared cutout means or unit described in the above fourth through eleventh embodiments transmit light emission wavelengths of a second light source, so defect information reading with a second light source can be performed in the state that the above infrared cutout means or unit exists on the optical path. Also, infrared cutout filters which are expensive and difficult to maintain in high surface precision do not need to be used, so costs of the apparatus can be reduced. Also, the infrared cutout means or unit can be integrally formed on the mirror, imaging lens, or CCD, so there is no need to add an extra filter member, so deterioration of the read image can be reduced at low costs.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image reading apparatus comprising:
   image pickup elements which read image information recorded on an original;
   a first light source which emits light primarily in a first range and in a second range which does not include said first range;
   a second light source which emits light primarily in a third range which does not include said first and second ranges, said second light source being different from said first light source; and
   a filter disposed within the optical path from said first or second light source to said image pickup elements, that does not transmit light in said second range but transmits light in said third range,
   wherein said apparatus has a first reading mode in which the light from the original emitted by said first light source is guided to said image pickup elements via said filter to obtain the image information recorded on the original, and a second reading mode in which the light from the original emitted by said second light source is guided to said image pickup elements via said filter to obtain predetermined information other than the recorded image information existing on the original.

2. An image reading apparatus according to claim 1, wherein the predetermined information existing on the original is information generated by foreign matter or scratches existing on the original itself shielding the light from said second light source.

3. An image reading apparatus according to claim 1, further comprising a focus correcting unit adapted to correct the focal position.

4. An image reading apparatus according to claim 3, further comprising a driving unit adapted to drive said focus correcting unit.

5. An image reading apparatus according to claim 1, further comprising a lighting control unit adapted to selectively light said first light source and said second light source.

6. An image reading apparatus according to claim 4, wherein said focus correcting unit comprises a parallel plate glass which is inserted into or extracted from the optical path by said driving unit, and wherein the thickness of said parallel plate glass in the direction of the optical axis is such that the focal position at the time of said image information reading unit reading said image information and the focal position at the time of said defect information reading unit reading said defect information is the same position.

7. An image reading apparatus according to claim 4, wherein said focus correcting unit is configured of a mechanism which moves said image pickup elements in the direction of the optical axis by said driving unit, and wherein the amount of movement of said image pickup elements is set such that the focal position at the time of reading the image information and the focal position at the time of reading the predetermined information is the same position.

8. An image reading apparatus according to claim 4, wherein said focus correcting unit is configured of a mechanism which moves an imaging lens within the optical system in the direction of the optical axis by said driving unit, and wherein the amount of movement of said imaging lens is set to a value such that the focal position at the time of reading the image information and the focal position at the time of reading the predetermined information is the same position.

9. An image reading apparatus according to claim 1, wherein said first light source is a fluorescent lamp, and said second light source is an LED with a peak wavelength of approximately 880 nm.

10. An image reading apparatus according to claim 1, wherein said filter is attached to said image pickup elements.

11. An image reading apparatus according to claim 1, wherein said filter is provided at a predetermined plane of a mirror positioned within said image reading apparatus.

12. An image reading apparatus according to claim 1, wherein said filter is provided at a predetermined plane of a lens positioned within said image reading apparatus.

13. An image reading apparatus according to claim 1, wherein said third range is situated at a position with longer wavelength as compared to said second range.

14. An image reading apparatus according to claim 1, wherein said third range is situated at a position with shorter wavelength as compared to said second range.

15. An image reading apparatus comprising:
    image pickup elements which read image information recorded on an original;
    a first light source which emits light at least in a first range;
    a second light source which emits light in a second range which does not include said first, said second light source being different from said first light source; and
    a filter that does not transmit light in the second range,
    wherein said apparatus has a first reading mode in which the light from the original emitted by said first light source is guided to said image pickup elements via said filter to obtain the image information recorded on the original, and a second reading mode in which the light from the original emitted by said second light source is guided to said image pickup elements via said filter to obtain predetermined information other than the recorded image information existing on the original.

16. An image reading apparatus according to claim 15, wherein the predetermined information existing on the original is information generated by foreign matter or scratches existing on the original itself shielding the light from said second light source.

17. An image reading apparatus according to claim 16, further comprising:
- a lighting control unit adapted to selectively light said first light source and said second light source; and
- an inserting/retracting unit adapted to insert or retract said filter into or from the optical path.

18. An image reading apparatus according to claim 15, wherein the thickness of said filter in the direction of the optical axis is set at a valve such that the focal position of said image pickup elements at the time of said image pickup elements reading the image information and the focal position of said image pickup elements at the time of reading the predetermined information is the same position.

19. An image reading apparatus according to claim 15, further comprising an imaging optical system, and wherein said filter is positioned on the optical path, between said imaging optical system and said image pickup elements.

20. An image reading apparatus according to claim 15, wherein said first light source is a fluorescent lamp, and said second light source is an LED.

21. An image reading apparatus according to claim 15, wherein said first light source is a halogen lamp, and said second light source is an LED.

22. An image reading method, comprising the steps of:
- causing a first light source to emit light primarily in a first range and in a second range that does not include said first range;
- causing a second light source to emit light primarily in a third range that does not include said first and second ranges, the first and second light sources being different from each other;
- guiding transmitted light from an original based on light from the first light source to image pickup elements via a filter that does not transmit light in the second range but transmits light in said third range, and reading image information recorded on the transmitting original recording medium based on signals obtained from the image pickup elements;
- guiding transmitted light from the original based on light from the second light source to the image pickup elements via the filter, and reading predetermined information other than recorded image information existing on the original based on signals obtained from the image pickup elements.

23. An image reading method, comprising the steps of:
- causing a first light source to emit light at least in a first range;
- causing a second light source to emit light in a second range that does not include said first range, the first and second light sources being different from each other;
- guiding transmitted light from an original based on light from the first light source to image pickup elements via a filter that does not transmit light in the second range, and reading image information recorded on the transmitting original recording medium based on signals obtained from the image pickup elements;
- guiding transmitted light from the original based on light from the second light source to the image pickup elements without using the filter, and reading predetermined information other than recorded image information existing on the original based on signals obtained from the image pickup elements.

* * * * *

UNITED STATES PATENT AND TRADEMARK OFFICE
CERTIFICATE OF CORRECTION

PATENT NO.   : 6,493,061 B1                                              Page 1 of 1
DATED        : December 10, 2002
INVENTOR(S)  : Shinichi Arita et al.

It is certified that error appears in the above-identified patent and that said Letters Patent is hereby corrected as shown below:

Column 22,
Line 50, "first," should read -- first range, --; and
Line 60, "via" should read -- without using --.

Column 23,
Line 9, "valve" should read -- value --.

Signed and Sealed this

Fourteenth Day of October, 2003

JAMES E. ROGAN
*Director of the United States Patent and Trademark Office*